United States Patent
Tsuchida et al.

(10) Patent No.: US 6,256,621 B1
(45) Date of Patent: *Jul. 3, 2001

(54) DATABASE MANAGEMENT SYSTEM AND QUERY OPERATION THEREFOR, INCLUDING PROCESSING PLURAL DATABASE OPERATION REQUESTS BASED ON KEY RANGE OF HASH CODE

(75) Inventors: Masashi Tsuchida, Sagamihara; Yukio Nakano, Yokohama; Nobuo Kawamura, Sagamihara; Kazuyoshi Negishi, Yokohama; Shunichi Torii, Musashino, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/432,755

(22) Filed: Nov. 3, 1999

Related U.S. Application Data

(63) Continuation of application No. 09/148,648, filed on Sep. 4, 1998, now Pat. No. 6,026,394, which is a continuation of application No. 08/810,527, filed on Mar. 4, 1997, now Pat. No. 5,806,059, which is a continuation of application No. 08/080,674, filed on Jan. 13, 1994, now abandoned.

(30) Foreign Application Priority Data

Jan. 20, 1993 (JP) .................................................. 5-007804

(51) Int. Cl.$^7$ .................................................. G06F 17/30
(52) U.S. Cl. .................................. 707/2; 707/7; 707/10; 714/11
(58) Field of Search .............................. 707/1–4, 7, 10; 709/105–106, 202; 714/11

(56) References Cited

U.S. PATENT DOCUMENTS

| | | |
|---|---|---|
| 5,091,852 | 2/1992 | Tsuchida et al. . |
| 5,191,578 | 3/1993 | Lee . |
| 5,412,806 | 5/1995 | Du et al. . |
| 5,471,622 | 11/1995 | Eadline . |
| 5,765,146 * | 6/1998 | Wolf et al. ................................. 707/2 |
| 5,806,059 * | 9/1998 | Tsuchida et al. ......................... 707/2 |
| 5,845,113 * | 12/1998 | Swami et al. ............................ 707/7 |
| 6,026,394 * | 2/2000 | Tsuchida et al. ......................... 707/3 |

OTHER PUBLICATIONS

"Dyanamic and Load–balanced Task–Oriented Database Query Processing in Parallel Systems," Proceedings of the Third 1992 International Conference on Extending Databse Technology, Vienna, Austria, Mar., 1992, pp. 357–372.*

DeWitt et al., "Parallel Database Systems: The Future of High Performance Database Systems," Communications of the AMC, V. 35, No. 6, 1922, pp. 85–98.

(List continued on next page.)

Primary Examiner—Hosain T. Alam
(74) Attorney, Agent, or Firm—Mattingly, Stanger & Malur, P.C.

(57) ABSTRACT

A database management system for executing database operations in parallel by a plurality of nodes and a query processing method are described. The database management system contains a decision management node for deciding a distribution node for retrieving information so as to analyze a query received from an application program, generate a processing procedure for processing the query, and execute the process, and a join node for sorting, merging, and joining the information retrieved by the distribution node. When the query process is executed, the distribution node decided by the decision management node retrieves the information to be processed and the join node decided by the decision management node also obtains the result for the query from the retrieved information. The query result is outputted from an output node and transferred to the application program.

23 Claims, 20 Drawing Sheets

OTHER PUBLICATIONS

DeWitt et al., "GAMMA—A High Performance Dataflow Database Machine", Proceedings of the Twelfth International Conference on Very Large Databases, Kyoto, Aug. 1986, pp. 228–237.

"Dynamic and Load–Balanced Task–Oriented Database Query Processing in Parallel Systems," Lu et al., Dept of Info Sys, National Univ. of Singapore, Advances in Database Technology, EDBT 1992, pp. 357–372.

"Parallel Computer Architecture", vol. 21, No. 4, Mar. 1989.

* cited by examiner

TO ANOTHER SYSTEM

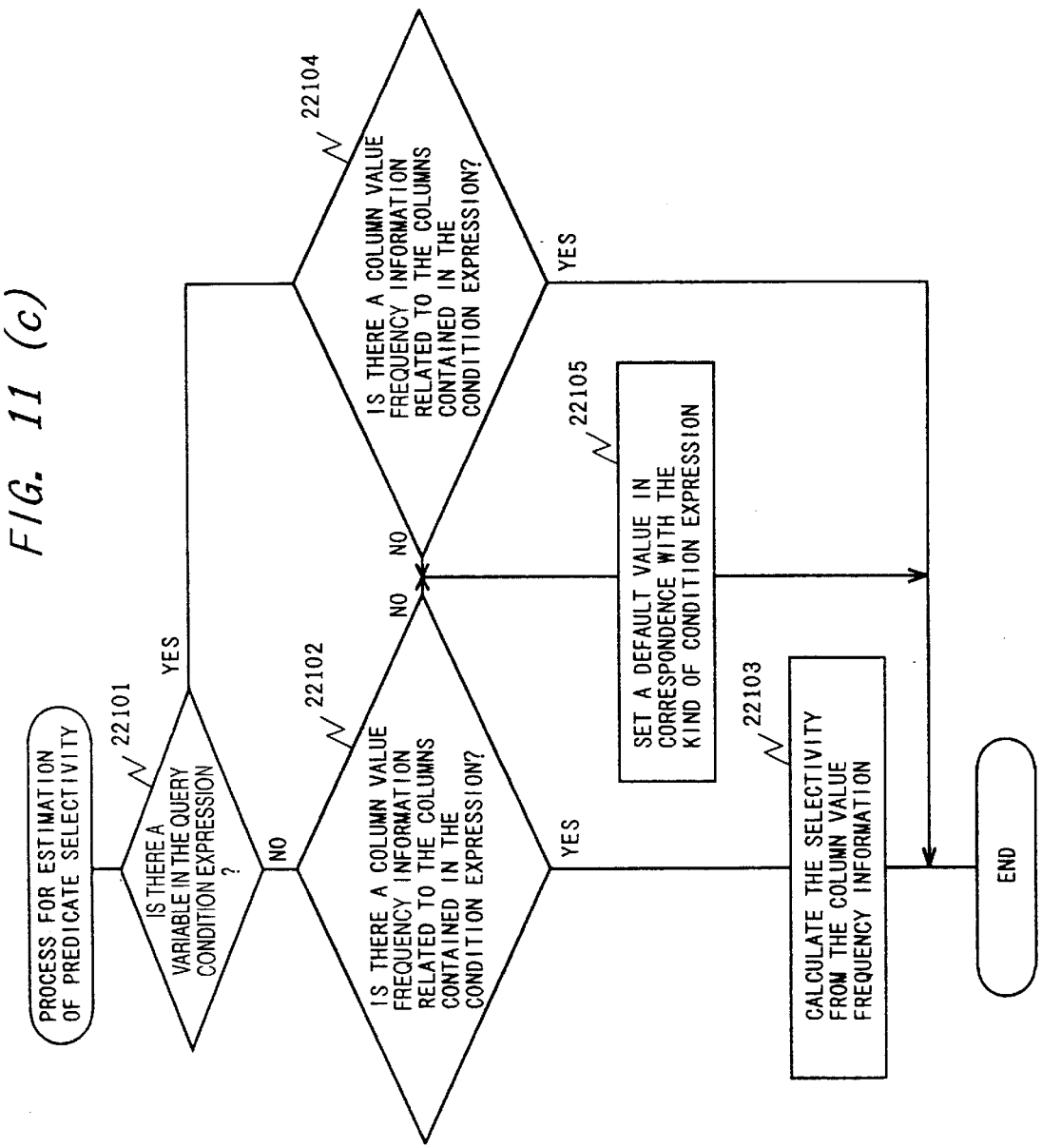

DATABASE MANAGEMENT SYSTEM AND QUERY OPERATION THEREFOR, INCLUDING PROCESSING PLURAL DATABASE OPERATION REQUESTS BASED ON KEY RANGE OF HASH CODE

This is a continuation application of U.S. Ser. No. 09/148,648, filed Sep. 4, 1998, now U.S. Pat. No. 6,026,394, which is a continuation application of U.S. Ser. No. 08/810, 527, filed Mar. 4, 1997, now U.S. Pat. No. 5,806,059, which is a continuation application of U.S. Ser. No. 08/080,674, filed on Jan. 13, 1994, which is now abandoned.

BACKGROUND OF THE INVENTION

The present invention relates to a database management system and more particularly to a database processing method which is suitable for a parallel query process suited to a relational database management system.

A database management system (hereinafter abbreviated to DBMS), particularly a relational DBMS processes a query which is represented in a non-procedural database language, decides the internal processing procedure, and executes the query process according to this internal processing procedure. As a database language, a database language which is regulated in Database Language SQL ISO 9075:1989 and called SQL is widely used. Among main conventional query processing methods, there are a method for deciding a single internal processing procedure on the basis of the predefined rule and a method for deciding an optimum procedure from a plurality of candidate processing procedures which are selected using various statistical information according to cost evaluation. In the case of the former, the load for generating the processing procedure is small, though there is a problem imposed in the propriety of the rules which are set uniformly and there is also a problem imposed in the optimization of the selected internal processing procedure.

The latter manages various statistical information, generates a plurality of candidate processing procedures, and calculates the load for cost evaluation for each of those procedures so as to select an optimum processing procedure. A technique obtained by combining the above two methods is indicated in, for example, Satoh, K., et. al. "Local and Global Optimization Mechanism for Relational Database", Proc. VLDB, 1985, pp. 405–417. According to the technique indicated in Satoh et al., the processing procedure is decided by inferring the amount of data to be processed from the query condition.

In a large number of DBMSs, the query process is implemented via processing of two phases consisting of the query analysis process and query execution process. For example, when embedding a query into an application program described in a host language such as COBOL or PL/I, the query analysis process is performed for the query embedded in the application program before executing the application program and an internal processing procedure is generated in the executable form. The query process according to this internal processing procedure is executed when the application program is executed. In most cases, a variable used in the host language is contained in the retrieval condition expression which is described in the query. A constant is substituted for this variable when the internal processing procedure obtained as a result of the query analysis process is executed, that is, when the query process is executed. In this case, a plurality of optimum processing procedures can be considered according to the value which is substituted for the variable when the query process is executed. Therefore, there is a problem imposed that a processing procedure which is obtained by the query analysis process beforehand is not always optimum. To solve this problem, a technique is known that a plurality of processing procedures are generated beforehand when the query analysis process is performed and the processing procedure is selected according to the value which is substituted for the variable when the query process is executed. Such a technique is indicated in, for example, U.S. Pat. No. 5,091,852 or Graefe, G., et. al. "Dynamic Query Evaluation Plans", Proc. ACM-SIGMOD, 1989, pp. 358–366.

An offer of a parallel database system which is scalable in correspondence with an increase in the transaction amount and an increase in the database amount which exceed an increase in the CPU performance of computer systems and an increase in the storage capacity of disk units is desired from users recently. Performance requirements for database systems which are desired by users are application to more than tens of thousands of users in concurrent execution, realization of retrieval transactions in units of tera bytes, and guarantee of a response time which is not in proportion to the table size. As a system in response to such a request, a great deal of attention is attracted to a parallel database system jointly with a recent reduction in the hardware cost. The parallel database system is described in, for example, DeWitt, D., et. al.: "Parallel Database System: The Future of High Performance Database Systems", CACM, Vol. 35, No. 6, 1992, pp. 85–98. In the parallel database system, a plurality of processors are tightly or loosely coupled with each other and the database process is distributed to these plurality of processors statically or dynamically. In each node (a processor or a pair of a processor and disk unit), database operations are executed in parallel or in the manner of the pipeline operation. Even in such a parallel processing system, the processing procedure can be selected in each node by applying the aforementioned technique.

Generally in a parallel database system, as the parallelism increases, the response performance improves. However, when the parallelism is excessively increased, problems such as an increase in the overhead or an increase in the response time of transactions may be imposed. Therefore, it is important to set a moderate parallelism. However, in a conventional parallel database system, a reference for deciding the number of nodes to be used for database operations is not defined. Therefore, it is difficult to obtain an appropriate parallelism and to realize an optimum load distribution. Data to be used for database operations is separately stored in each node. If there is a scattering in the data amount stored in each node when performing database operations in the manner of the pipeline operation, the processing time in each node is biased and the pipeline operation cannot be performed smoothly.

SUMMARY OF THE INVENTION

An object of the present invention is to eliminate the aforementioned difficulties in a conventional parallel database system and to provide a database management system and a database processing method for realizing a quicker query process.

The database management system of the present invention has a plurality of nodes for executing the database process in a suitable form and is structured so that these plurality of nodes are connected to other nodes via a network. The plurality of nodes include at least one distribution node having a storage means of distributing and storing the database to be queried and a distribution means of retrieving information from the above storage means and distributing the retrieved information to other nodes. The plurality of nodes also include at least one join node having a sorting means of sorting information distributed from the distribution node, a merge means of merging the plurality of sorted information, if any, and a join means of joining a query on the basis of the merged information.

Furthermore, the plurality of nodes include at least one decision management node having an analysis means of receiving a query, analyzing the query, and generating the query processing procedure, a decision means of deciding the distribution nodes and join nodes for performing the execution process on the basis of the query analysis result of the above analysis means, and an output means of outputting the result for the query obtained from the join node. The decision means of the decision management node desirably decides the distribution node on the basis of the query analysis result of the analysis means, calculates the expected processing time in the distribution node, and decides the join node on the basis of this processing time.

The decision means distributes retrieval information equally to each join node on the basis of the expected retrieval information amount in the decided distribution node. Each of the distribution nodes decided by the decision means retrieves information from the storage means on the basis of the query analysis result and distributes the information to another node. The join node inputs information distributed from the distribution node one by one and processes each inputted information. The distribution node and join node process information independently. Each of the join nodes sorts information distributed from the distribution node, merges the sorted information when it consists of a plurality of information types, joins a query on the basis of the merged information, and outputs the result for the query obtained from the join node.

To assign retrieval information equally to the join nodes by the decision means in a more desirable form, the decision management node has a storage means of storing column value frequency information relating to the information of the storage means of each node.

According to the query processing method of the present invention, the number of nodes can be decided in correspondence with the database operation which is executed in each node. When there is a scattering in distribution of data, the data is equally distributed to each node, and each database operation to be executed in each node is parameterized, and the expected processing times are equalized. Therefore, the processing time in each node is not biased and the pipeline operation can be performed smoothly.

BRIEF DESCRIPTION OF THE DRAWINGS

FIG. 11(*b*) is a flow chart of the static optimization process.

FIG. 11(*c*) is a flow chart of the process for estimation of predicate selectivity.

FIG. 11(*d*) is a flow chart of the process for access path pruning.

FIG. 11(*e*) is a flow chart of the processing procedure candidate generation process.

FIG. 11(*f*) is a flow chart of the code generation process.

FIG. 12(*b*) is a flow chart of the process for dynamic optimization.

FIG. 12(*c*) is a flow chart of the data retrieval distribution process which is executed in the distribution node for the process for code interpretation execution.

FIG. 12(*d*) is a flow chart of the join process which is executed in the join node for the process for code interpretation execution.

FIG. 12(*e*) is a flow chart of the output process of the query process result which is executed in the output node for the process for code interpretation execution.

DETAILED DESCRIPTION OF THE PREFERRED EMBODIMENT

Figure 1:
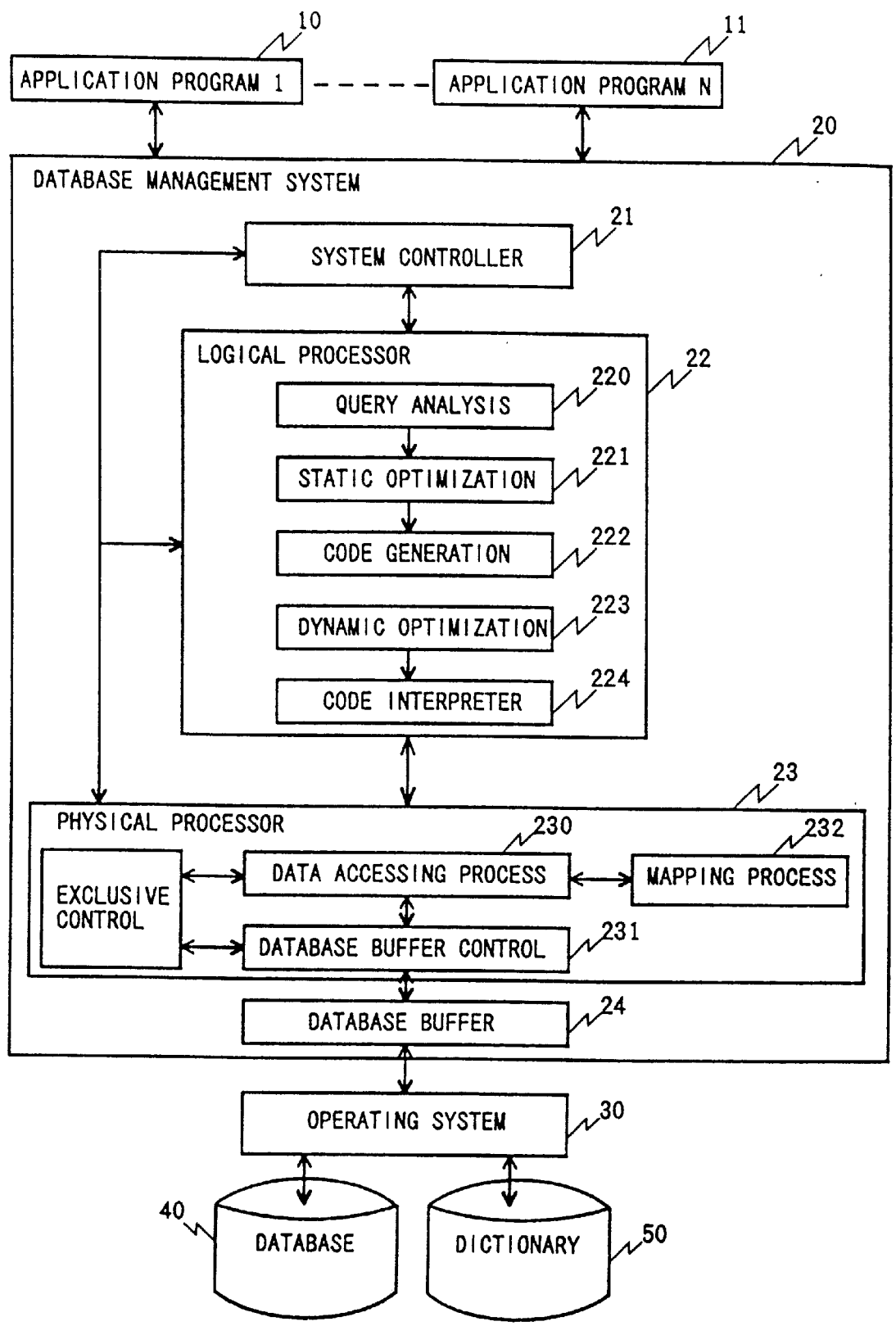
FIG. 1 is a block diagram showing the conceptual structure of a database management system.

FIG. 1 is a block diagram showing the conceptual structure of the database system of this embodiment. In FIG. 1, the database system has a plurality of application programs (hereinafter abbreviated to AP) 10 and 11 which are prepared by a user, a database management system (hereinafter abbreviated to DBMS) 20 for managing the entire database system such as query process and resource management, an operating system (hereinafter abbreviated to OS) 30 for reading and writing data for I/O processing in the database process and managing the entire computer system, a database 40 for storing data for database processing, and a dictionary 50 for managing database definition information. In the dictionary 50, the column value frequency information on the join columns which are used in this embodiment is stored.

The DBMS 20 has a system controller 21 for managing input and output of data in addition to management and control of the entire system, a logical processor 22 for performing a logical process for a query, a physical processor 23 for executing a physical process for the database, and a database buffer 24 for storing data for processing by the DBMS 20. The logical processor 22 has a query analysis processing unit 220 for analyzing the syntax and meaning of a query, a static optimization processing unit 221 for generating at least an appropriate processing procedure, a code generator 222 for generating codes corresponding to the processing procedure, a dynamic optimization processing unit 223 for selecting an optimum processing procedure from the processing procedure candidates generated by the static optimization processing unit 221, and a code interpreter 224 for interpreting codes in the selected optimum processing procedure. The physical processor 23 has a database access processing unit 230 for realizing decision and editing of conditions of the accessed data and addition of records, a database buffer controller 231 for controlling writing and reading of database records, a mapping processing unit 232 for managing the storage position of data for input and output, and a concurrency controller 233 for realizing exclusive control of the resource shared by the system.

Figure 2:
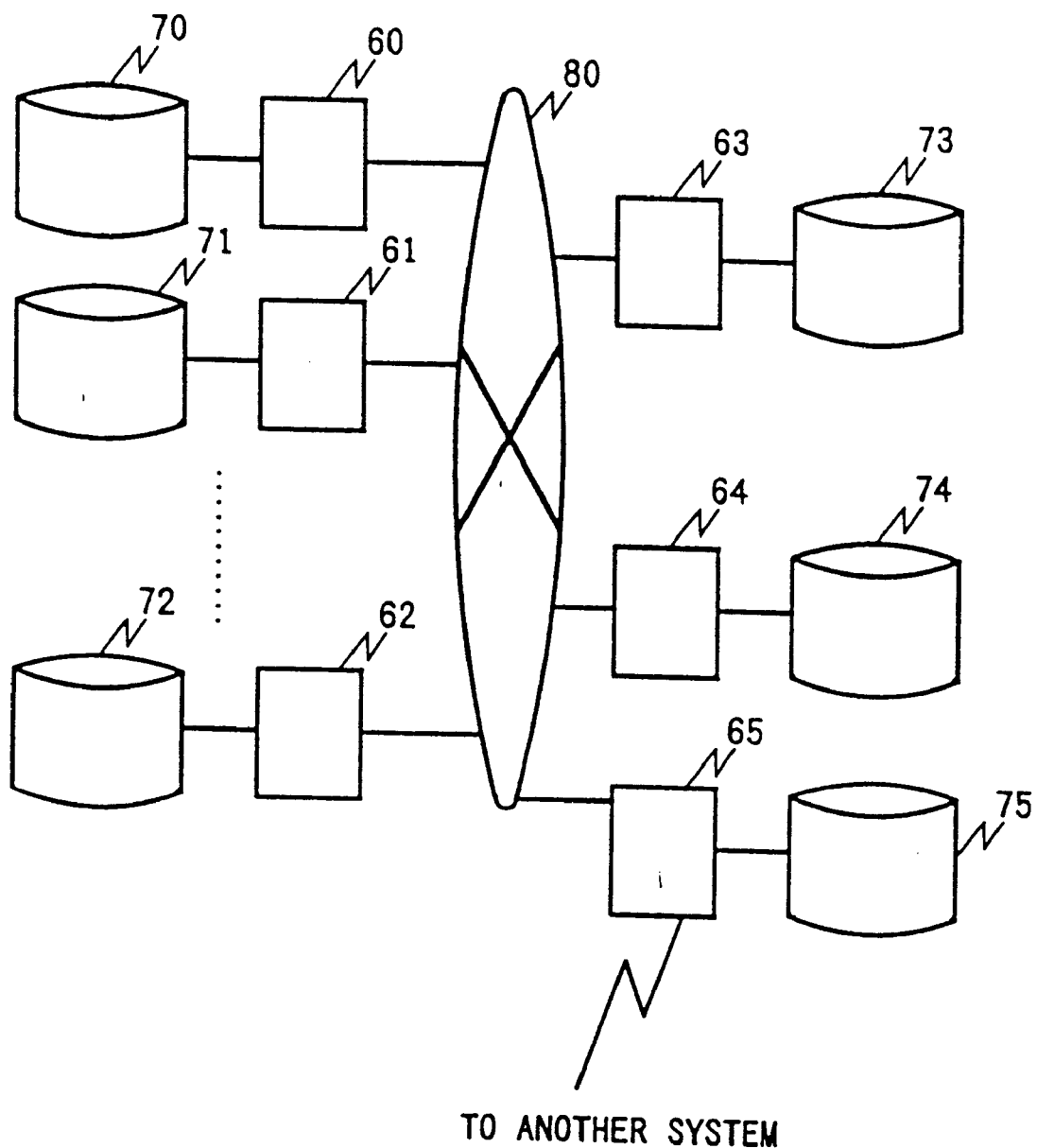
FIG. 2 is a block diagram of a database management system.

FIG. 2 is a block diagram showing an example of the hardware structure of the database management system of the present invention. In FIG. 2, processors 60 to 65 are connected to each other via an interconnection network 80. Disk units 70 to 75 are connected to the processors 60 to 65 respectively. Each of the processors 60 to 65 and each of the disk units 70 to 75 which are connected to the processors constitute a node. Thus, a parallel processor system having a plurality of nodes is constituted. The hardware structure shown in FIG. 2 is a structure for executing the database processing in the database management system shown in FIG. 1 by a plurality of processors in parallel and the processing is distributed to the nodes.

Figure 3:
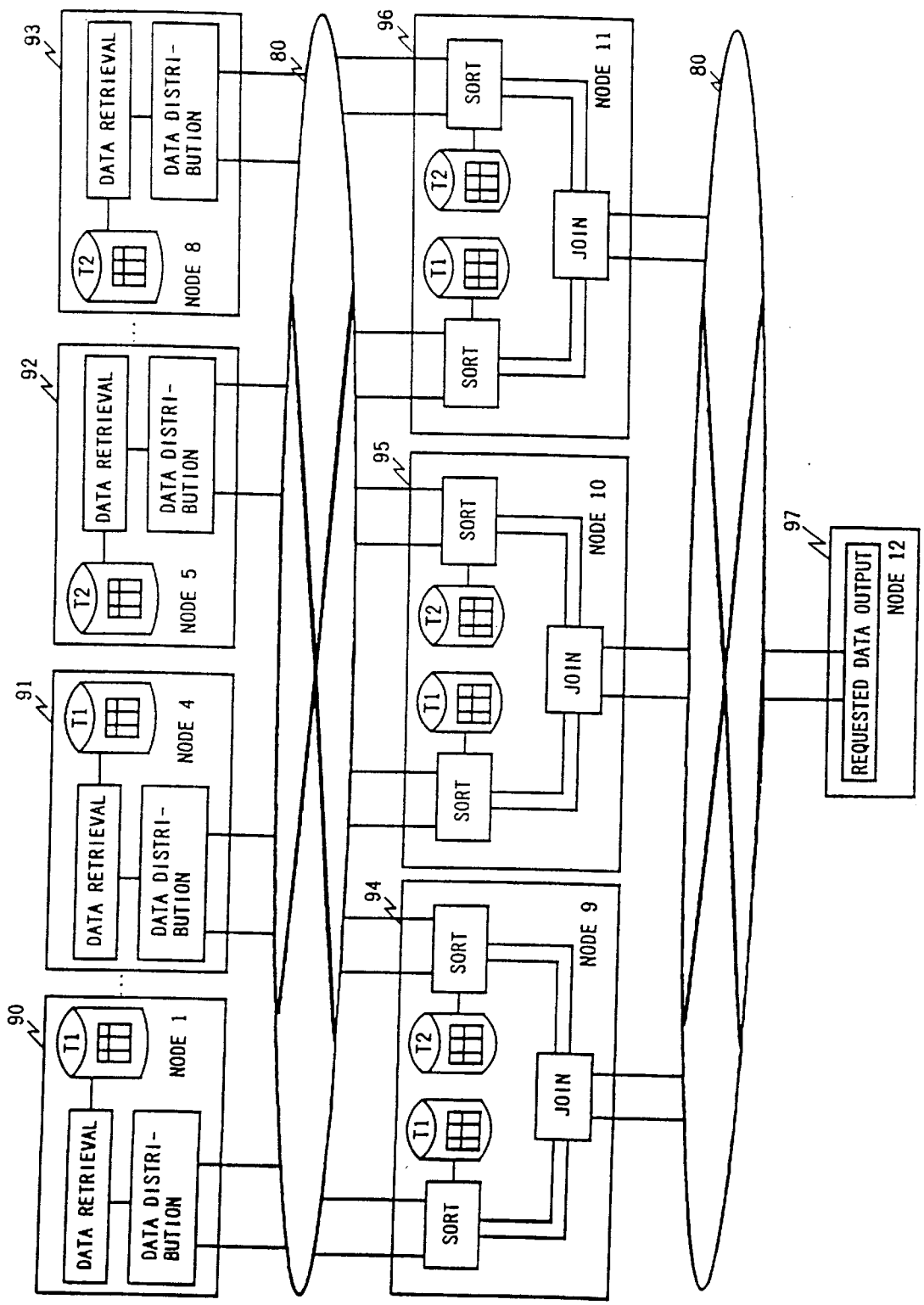
FIG. 3 is a block diagram showing an example of the node structure of a database management system.

FIG. 3 is a block diagram showing an example of the node structure for processing a retrieval request to the database in parallel in this embodiment. To each node, a function for retrieving and distributing data for processing, a function for sorting the distributed data and joining the sort result, and a function for outputting the request data which is the join result are assigned. The database consists of tables which can be seen in a two-dimensional table form from a user. Data exists on each line or row of each table. Each row has at least one attribute (a "column").

In FIG. 3, there are database tables T1 and T2. The table T1 is separately stored in node "#1" 90 to node "#4" 91 and the table T2 is separately stored in node "#5" 92 to node "#8" 93. Node "#1" 90 to node "#8" 93 are distribution nodes. In each distribution node, the data retrieval process and data distribution process are executed on the basis of the table stored in it. Node "#9" 94 to node "#11" 96 are join nodes for receiving data outputted from the nodes "#1" to "#4" and from the nodes "#5" to "#8" and executing the perfect run building process by performing the partial run sorting process and merging process. Furthermore, node "#12" 97 is a decision management node for deciding the number of distribution nodes and join nodes which receive a query from a user, analyze the query, and execute the process for the query. The decision management node has a dictionary so as to integrate and manage the database. The node #12 also functions as an output node for receiving data outputted from the nodes "#9" to "#11" and outputting it as a query result. According to this embodiment, the node "#12" has both the function as a decision management node and the function as an output node. However, the system may be structured so that these functions are assigned to different nodes respectively. The function as an output node may be assigned to a plurality of nodes instead of one node. The dictionary may not be always mounted in the decision management node. The decision management node may read it from another node when necessary.

These nodes are connected to each other via the interconnection network 80. The nodes #1 to #4 and nodes #5 to #8 operate in parallel with the nodes #9 to #11. The results processed by the nodes #1 to #4 and nodes #5 to #8 respectively are processed by the nodes #9 to #11 successively and the processing is performed in a manner of the pipeline operation as a whole (hereinafter called a parallel pipeline operation). The processing between the nodes #9 to #11 and node #12 is also performed in a manner of the pipeline operation. Hereinafter, the partial run sorting process in the nodes #9 to #11 is referred to as a slot sorting process and the perfect run building process is called an N-way merge process. The slot sorting process means an intra-page sorting process for pages where data is to be stored. When the data is read in the order of slots, the rows are accessed in the ascending order. The N-way merge process inputs N sort runs at each merge stage using an N-way buffer and generates a sort run finally. In FIG. 3, nodes #2, #3, #6, and #7 are not shown.

A query for the database retrieval process is described, for example, in the SQL as shown below.

SELECT T1. C3, T2. C3

FROM T1, T2

WHERE T1. C1=T2. C1

AND T1. C2=?

By this query, the column 3 in Table T1 and the column C3 in Table T2 can be obtained as output from Table T1 and Table T2 in which the column C1 in Table T1 is equal to the column C1 in Table T2 and the column C2 in Table T1 is equal to the value specified by a user. In the aforementioned query, "?" is a variable part and an actual value is substituted for it when the query is executed.

FIG. 3, explained previously, shows the node structure for processing such a query. When the node #12 receives a query, it selects the optimum distribution processing method and instructs each node as to the process to be executed by it via the network 80. Since Table T1 is stored in the nodes #1 to #4 and Table 2 in the nodes #5 to #8, the data retrieval process and data distribution process are executed by each node. The nodes #9 to #11 receive data outputted from the nodes #1 to #4 and nodes #5 to #8 successively and execute the sorting process and join process. The node #12 receives and outputs data outputted from the nodes #9 to #11. By doing this, the database retrieval ends.

Figure 4:
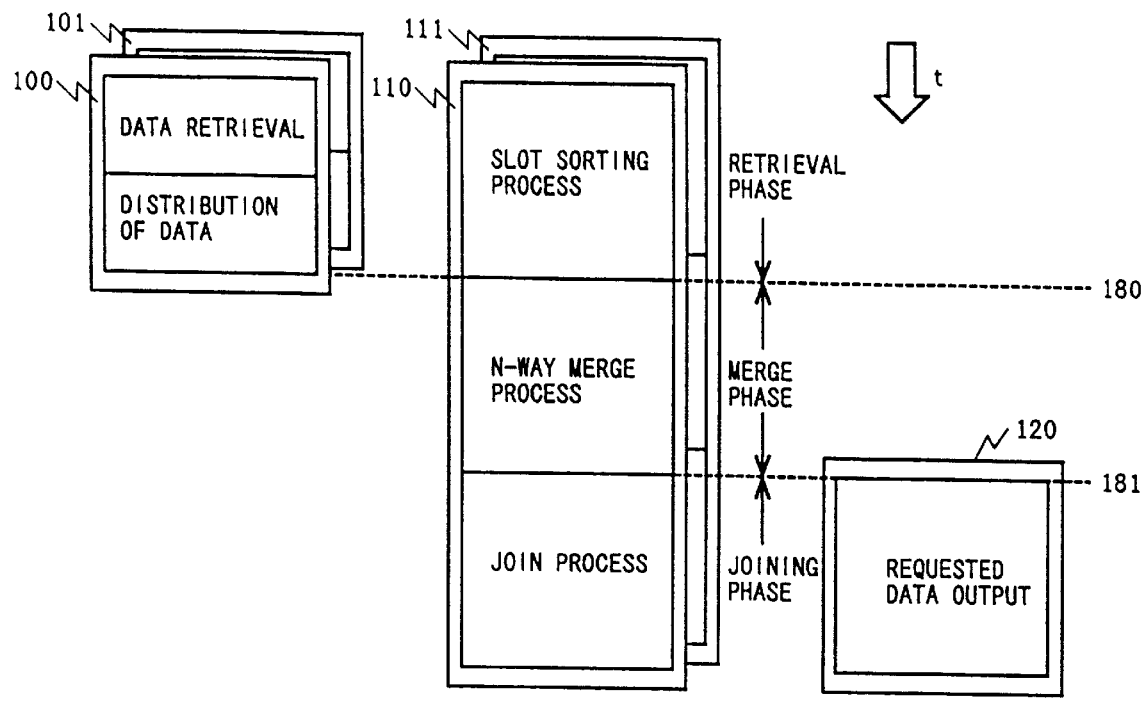
FIG. 4 is a schematic view showing the outline of the parallel pipeline operation.

Next, the relation of processing time between the above nodes will be explained with reference to FIG. 4. FIG. 4 is a schematic view for explaining the parallel pipeline operation. In FIG. 4, reference numerals 100 and 101 indicate processing parts consisting of the data retrieval process and data distribution process in correspondence with the processes in the nodes #1 to #8 shown in FIG. 3. Reference numerals 110 and 111 indicate processing parts consisting of the slot sorting process, N-way merge process, and join process in correspondence with the processes in the nodes #9 to #11. A reference numeral 120 indicates a requested data output process in correspondence with the process in the node #12. Along the time axis, data processed by the data retrieval process and data distribution process 100 and 101 is transferred to the slot sorting process successively and processed in a manner of the pipeline operation. From the data retrieval process to the slot sorting process is called a retrieval phase. The N-way merge process is executed in parallel in each node. This N-way merge processing period is called a merge phase. Furthermore, the result of the join process is transferred to the requested data output process 120 successively and processed in a manner of the pipeline operation. From this join process to the requested data output process is called a join phase.

Figure 5:
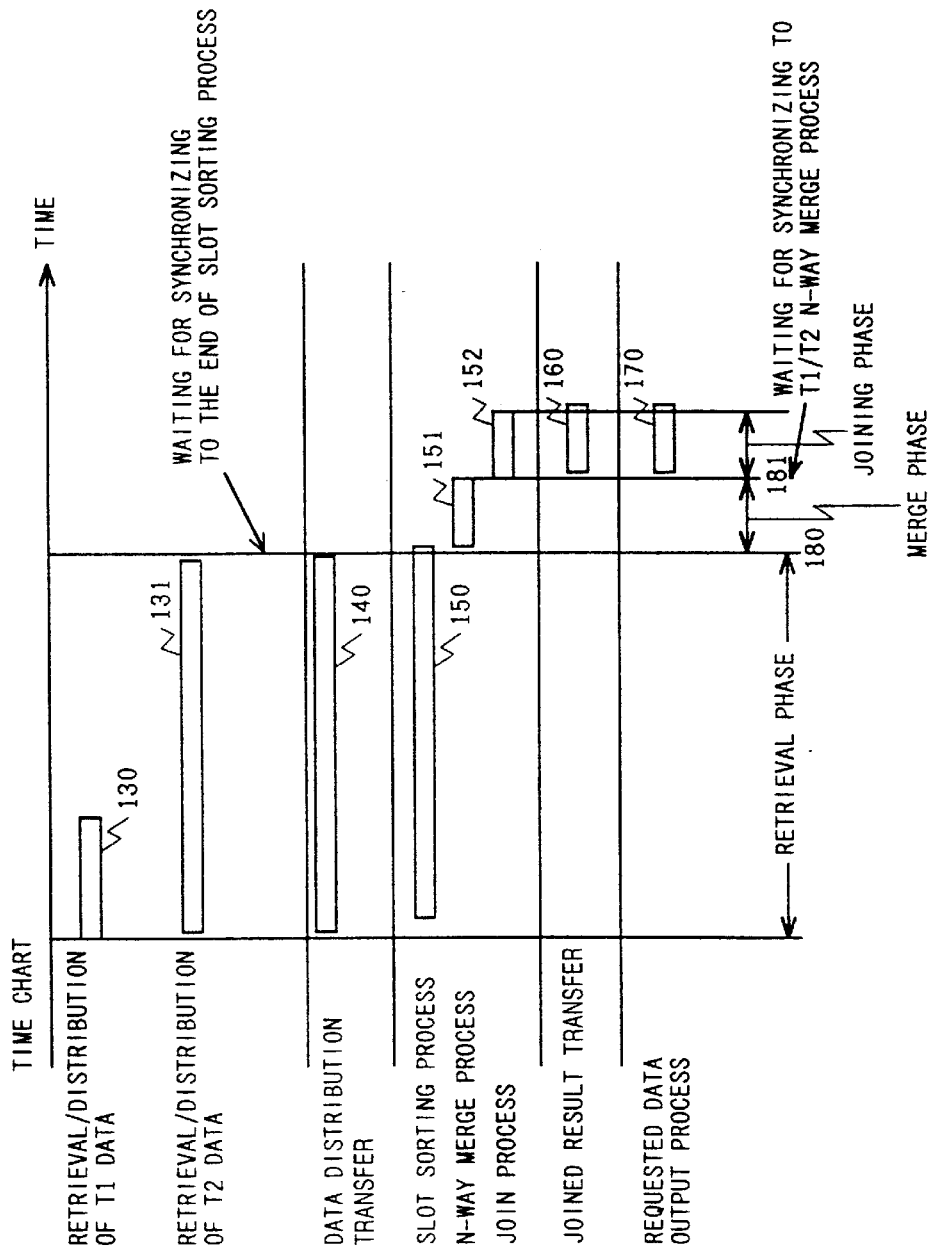
FIG. 5 is a timing chart showing the progress state of the query process.

The timing chart shown in FIG. 5 shows the progress state of the process for the aforementioned query. In the data retrieval phase, the processes in the nodes #1 to #4 are performed in the timing shown by the T1 data retrieval distribution processing time 130 and the processes in the nodes #5 to #8 are performed in the timing shown by the T2 data retrieval/distribution processing time 131. Data is transferred from the interconnection network 80 in the timing shown by the data distribution transfer time 140. The slot sorting processes in the nodes #9 to #11 are performed in the timing shown by the T1/T2 slot sorting processing time 150. As shown in FIG. 5, these processes are executed in parallel in the retrieval phase. The retrieval phase ends at the point of time of the waiting for synchronizing to the end of slot sorting process 180 or earlier. In the merge phase following the retrieval phase, the merge processes in the nodes #9 to #11 are executed in the time shown by the T1/T2 N-way merge processing time 151. The merge phase ends at the point of time of the waiting for synchronizing to T1/T2 N-way merge process 181 or earlier. In the join phase finally, the join processes in the nodes #9 to #11 are executed in the time shown by the join processing time 152 and the transfer process of transfer result by the interconnection network 80 is executed in the time shown by the joined result transfer time 160. In the node #12, the requested data output process is executed in the timing shown by the requested data output processing time 170. These processes in the join phase are also executed in parallel.

Figure 6:
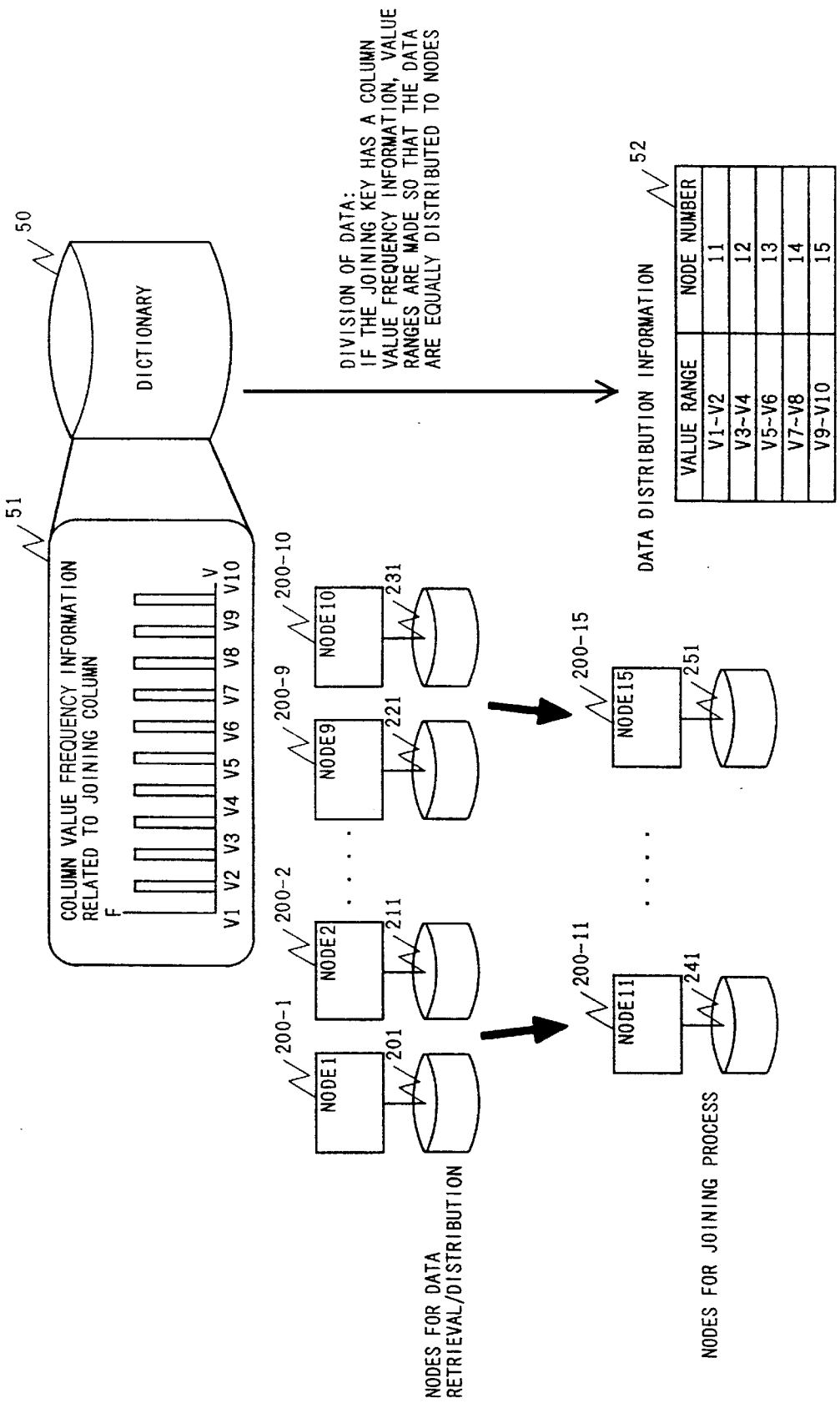
FIG. 6 is a schematic view of the data distribution process showing the data distribution method to each node.

Next, process distribution to each node in the decision management node will be explained. FIG. 6 is a schematic view of the data distribution process for explaining the distribution method to each node in the data distribution process. As a premise, there are 10 nodes for data retrieval/distribution, such as a node #1 to a node #10 having a processor 200-1 to a processor 200-10 and disk units 201 to 231. There are 5 nodes for the joining process, such as a node #11 to a node #15 having a processor 200-11 to a processor 200-15 and disk units 241 to 251. In a dictionary 50 which is held by the decision management node, column value frequency information 51 related to joining column (a column C1 in Table T1 and a column C1 in Table T2 in this case) is stored. The column value frequency information 51 is information to be used to equally distribute the data of the database. As to a column, for example, the column value distribution information showing the data distribution status of the column can be used. The column value frequency information 51 shown in FIG. 6 indicates that the data stored in the nodes #1 to #10 can be equally distributed within the value ranges v1 to v10. In this case, to distribute the data equally to the nodes #11 to #15, it is desirable to divide the data into five sections of v1 to v2, v3 to v4, v5 to v6, v7 to v8, and v9 to v10 and to distribute them in correspondence to the nodes #11, #12, #13, #14, and #15. On the other hand, when such column value frequency information does not exist in the decision management node, it is desirable to set an appropriate hash function and to distribute the data on the basis of it. The decision management node distributes the process to each node when the N-way merge process is to be executed by the data distribution method which is decided like this. By doing this, in the aforementioned case, the data can be distributed equally to the nodes #11 to #15 and the processing time in each node can be equalized.

Figure 7:
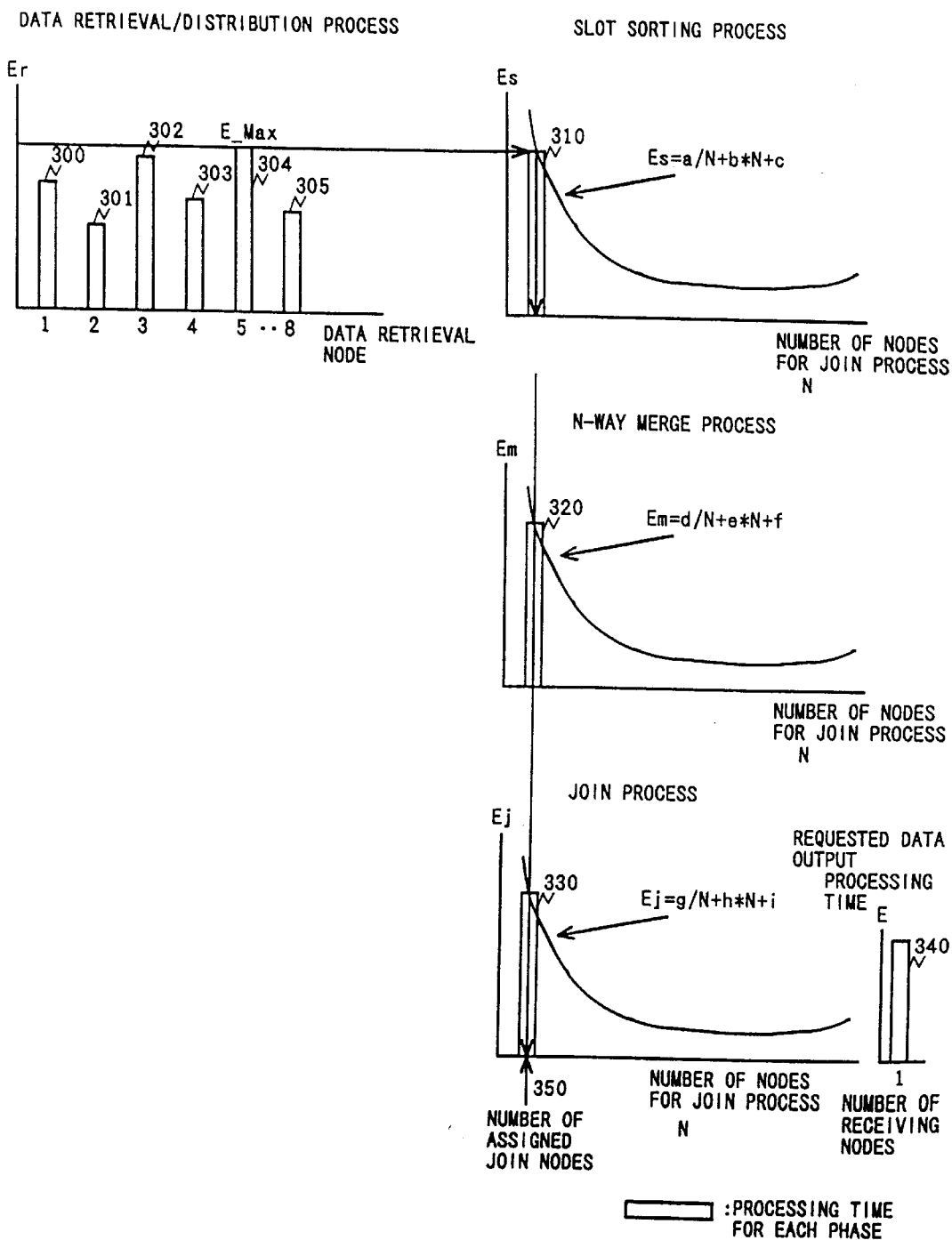
FIG. 7 is a schematic view for explaining the decision method for the number of join nodes.

Next, the method for deciding the number of join nodes for performing the N-way merge process will be explained with reference to FIG. 7. FIG. 7 is a schematic view for explaining the decision method for the number of join nodes. In FIG. 7, graphs of the phases of parallel join process explained in FIG. 3 and of the processing time of each process are made and laid out according to the parallel pipeline operation explained in FIG. 4. In FIG. 7, it is assumed that the data retrieval/distribution process is executed in the nodes #1 to #8 and the processing time in each node is the one shown at each of the numbers 300 to 305. In this example, the processing time 304 in the node #5 is the maximum processing time. The slot sorting processing time can be driven from the number of nodes for join process N, predetermined system characteristics (CPU performance, disk unit performance, etc.), and database operation method. The performance characteristic (processing time Es) of the slot sorting process can be obtained generally from the following expression.

$$Es = a/N + b*N + c \qquad (1)$$

The N-way merge processing time (Em) and join processing time (Ej) also can be obtained from the following expressions.

$$Em = d/N + e*N + f \qquad (2)$$

$$Ej = g/N + h*N + i \qquad (3)$$

where, symbols a, d, and g indicate constants which are decided from system characteristics such as the number of rows, the number of pages, each operation unit time, and output time. Symbols b, e, and h are constants which are decided from system characteristics such as the communication time, and c, f, and i are constants which are decided from the other system characteristics.

According to this embodiment, to maximize the effect of the pipeline process, the number of nodes for join process is obtained as the number of assigned join nodes 350 so that the performance characteristic Es of the slot sorting process becomes equal to the maximum processing time 304. When the number of assigned join nodes 350 is determined, the N-way merge processing time 320 and join processing time 330 can be estimated from the equations (2) and (3). The total of these processing times is the total processing time for a query. By deciding the number of join nodes in this manner and merging the data distributed in the data retrieval/distribution process successively and processing them simultaneously, the total processing time (response time from querying to output) can be shortened.

Next, the tuning method for shortening the response time furthermore on the basis of the deciding method for the number of join nodes which is explained in FIG. 7 will be explained with reference to FIGS. 8, 9, and 10. The tuning method which will be described hereunder is executed beforehand when the process distribution to each node is to be decided by the distribution means of the decision management node and the distribution is decided from the result.

Figure 8:
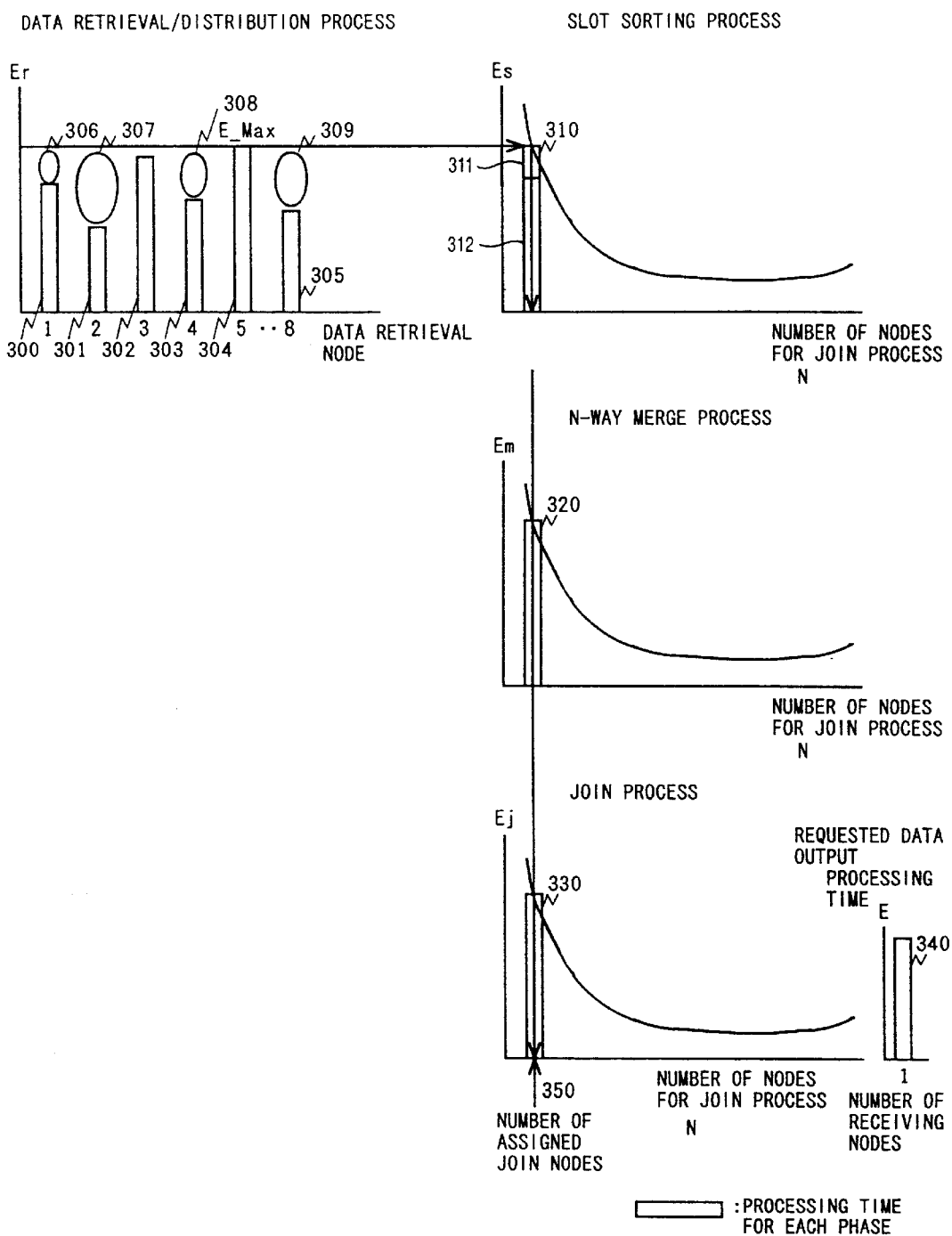
FIG. 8 is a schematic view for explaining the tuning by the slot sort preprocessing.

FIG. 8 is a schematic view of the tuning by the slot sort preprocessing. In the same way as in FIG. 7, it is assumed that the data retrieval/distribution process is executed in the nodes #1 to #8 and the processing time in each node is the one shown at each of the numbers 300 to 305. The processing time in each node varies with the number of data in each table. The slot sorting process is set so as to be executed by the nodes for join process. When the processing time varies with each node, the processing procedure for transferring the slot sorting process to the nodes for data retrieval/distribution is considered. For example, in a node where the data retrieval/distribution process is expected to end earlier as slot sort preprocessing, the slot sorting process is executed as shown at 306 to 309. By performing the slot sort preprocessing in this manner, the slot sort processing time by the nodes for join process can be reduced to about the value shown at 312. Using the reduced processing time shown at 311, the N-way merge process is transferred. This is nothing but extension of the run length of the slot sorting process. By doing this, the time 320 required for the N-way merge process can be reduced and as a result, the total response time can be reduced.

Figure 9:
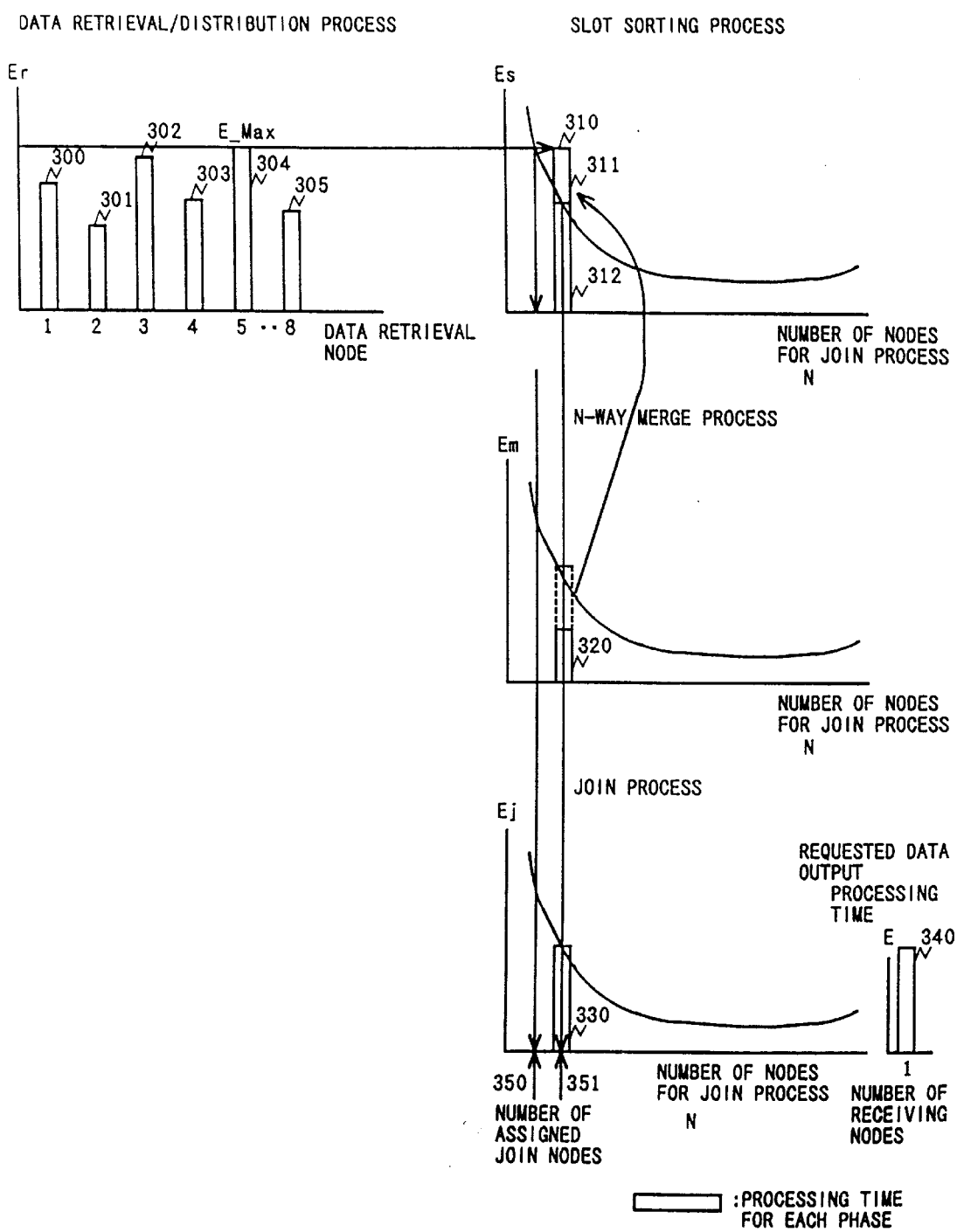
FIG. 9 is a schematic view for explaining the slot run length tuning.

FIG. 9 shows the outline of the slot sorting run length tuning. By the slot sorting run length tuning method, for example, when a plurality of processes are to be executed within a restricted processing time, if any, each database operation to be executed in each node is parameterized and the slot run length is tuned on the basis of the expected processing time. In this case, the number of nodes for join process is increased slightly more than the number of assigned join nodes 350 is obtained on the basis of the maximum processing time of the data retrieval/distribution process and the time required for the slot sorting process, is shortened. By doing this, the slot sorting processing time is reduced from 310 to 312. To maximize the pipeline effect, the N-way merge process is executed using the processing time 311 which is reduced by the slot sorting process. By doing this, the number of merging times of the N-way merge process is reduced, and the time required for the N-way merge process is reduced to 320. As a result, the response time can be reduced.

Figure 10:
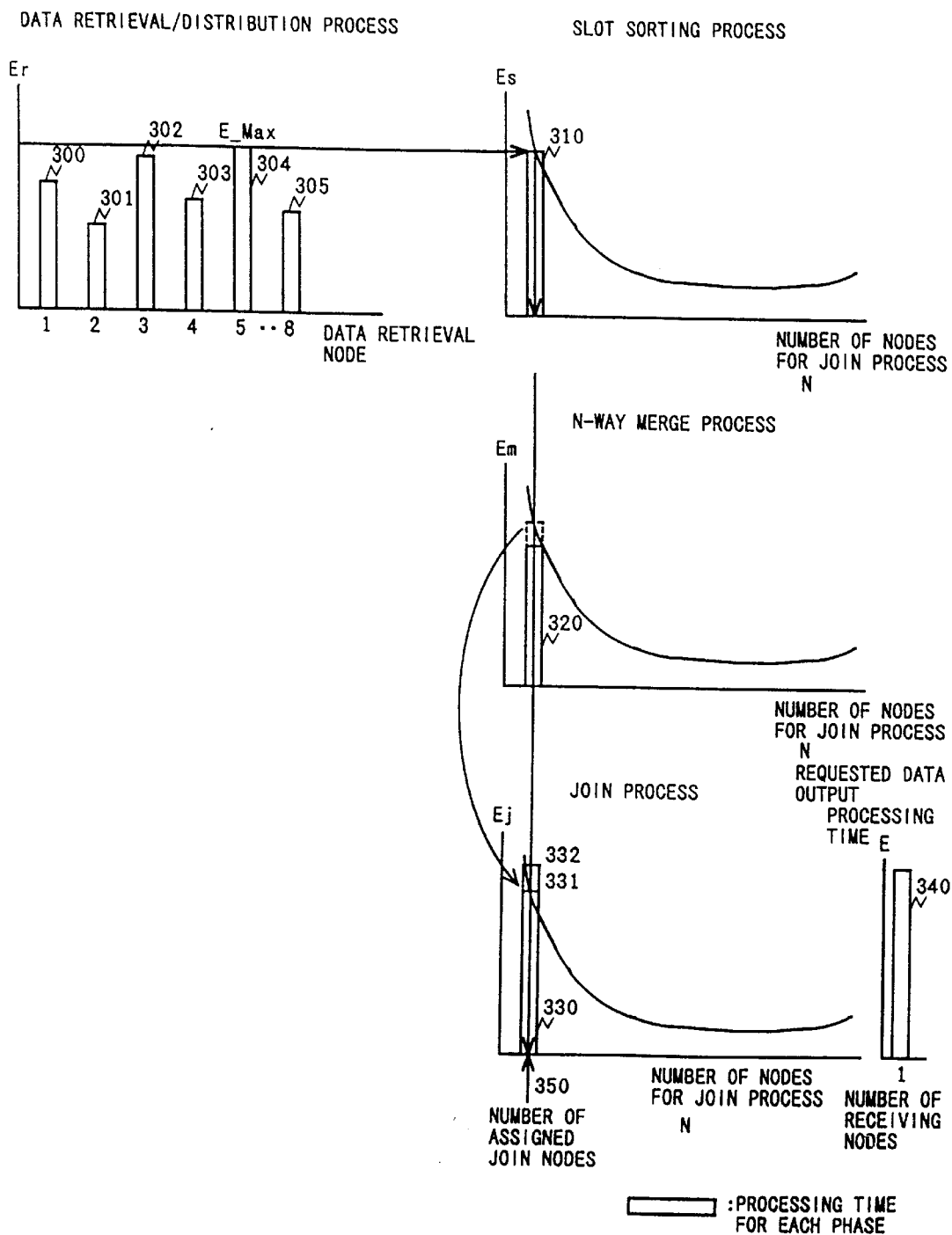
FIG. 10 is a schematic view for explaining the tuning of the number of times of N-way merging.

FIG. 10 shows the outline of the tuning of the number of times of N-way merging. This method can be applied when the join processing time 330 which is decided by the number of assigned join nodes 350 obtained per the explanation of FIG. 7 is smaller than the requested data output processing time 340. In the tuning of the number of times of N-way merging, the merge process at the final stage of the N-way merge process is transferred to the join process. Concretely, in a range that the sum of the merge processing time 331 at the final stage of the N-way merge process and the join processing time 330 is not more than the requested data output processing time 340, the merge process at the final stage is transferred to the join process. By doing this, the processing time of the N-way merge process is reduced and the total response time can be reduced.

Next, the operation flow of the database management system of this embodiment will be explained. FIG. 11(a) is a flow chart of the process for query analysis which is executed before starting query execution in the database management system of this embodiment. According to this embodiment, the process for query analysis is executed in the decision management node. The process for query analysis analyzes a query described in the SQL in the application program first (Step 220). At Step 220, the syntax and meaning of the query statement are analyzed. Next, the static optimization process is performed on the basis of the result of query analysis (Step 221). The static optimization process estimates the rate of data, which satisfy the condition expression which appears in the query, from the condition and generates at least one valid access path candidate (particularly selects an index) according to a preset rule. The static optimization process generates at least one processing procedure candidate on the basis of this access path candidate. Then, the static optimization process extends the processing procedure candidate generated at Step 221 in the executable form and generates a code corresponding to the processing procedure (Step 222).

FIG. 11(b) shows a detailed flow chart of the static optimization process. The static optimization process estimates the predicate selectivity from the result of query analysis first (Step 2210). The static optimization process prunes the access paths consisting of indices and others on the basis of the estimated predicate selectivity (Step 2211) and generates processing procedure candidates combining these access paths.

The procedure of the process for estimation of predicate selectivity (Step 2210) is shown in the flow chart shown in FIG. 11(c). The process for estimation of predicate selectivity (Step 2210) checks whether there is a variable in the query condition expression contained in the query (Step 22101). When there is a variable, the process for estimation of predicate selectivity checks whether there is column value frequency information related to the columns to which the variable is applied in this condition expression (Step 22104). When there is column value frequency information, the process for estimation of predicate selectivity ends here. When there is no column value frequency information at Step 22104, the process for estimation of predicate selectivity sets a predetermined default value as a predicate selectivity in correspondence with the kind of condition expression and the process for estimation of predicate selectivity ends (Step 22105). On the other hand, when there is no variable at Step 22101, the process for estimation of predicate selectivity checks whether there is column value frequency information in the condition expression (Step 22104). When there is no column value frequency information, the process for estimation of predicate selectivity sets a default value as a predicate selectivity in correspondence with the kind of condition expression in the same way as with Step 22104 and ends the processing (Step 22105). When there is column value frequency information at Step 22104, the process for estimation of predicate selectivity calculates the selectivity using the column value frequency information (Step 22103).

FIG. 11(d) shows a detailed flow chart of the process for access path pruning (Step 2212). The process for access path pruning registers access path candidates for index scan using the column indices appearing in the query condition expression (Step 22120). Next, the process for access path pruning checks whether the table to be accessed for the query is separately stored in a plurality of nodes (Step 22121). This check is made, for example, by referring to the information indicating the storage destination of the database which is contained in the dictionary 50. When the table is separately stored in a plurality of nodes, the process for access path pruning registers access path candidates for parallel table scan that the table stored in each node is accessed in parallel in the node (Step 22123). When the table is not separately stored, the process for access path pruning registers access path candidates for table scan that the table is accessed in the corresponding node (Step 22123). The process for access path pruning checks whether the predicate selectivity of each condition expression is already decided (Step 22124). When the predicate selectivity is already decided, the process for access path pruning gives the highest priority of access path to the index of the condition expression which minimizes the predicate selectivity related to each table (Step 22125). When the selectivity of the condition expression is not decided, the process for access path pruning obtains the maximum/minimum value of each predicate selectivity (Step 22126). Finally, the process for access path pruning calculates the predicate selectivity which is a threshold value for selection of each access path from the system characteristics such as the CPU performance, I/O performance, etc. (Step 22127) and registers access path candidates which are in combination of the single/plural indices registered at Step 22120, giving a predicate selectivity less than the threshold value calculated at Step 22127 (Step 22128).

FIG. 11(e) shows a detailed flow chart of the process for generation of processing procedure candidates (Step 2213). The process for generation of processing procedure candidates checks whether the table to be accessed for the query is separately stored in a plurality of nodes (Step 22130).

Figure 11:
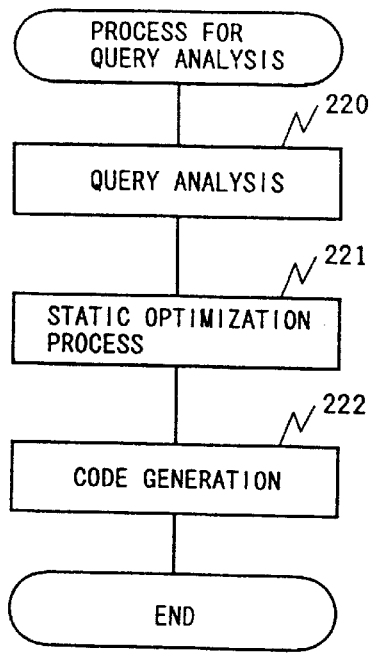
FIG. 11(*a*) is a flow chart of the query analysis process.
Figure 11:
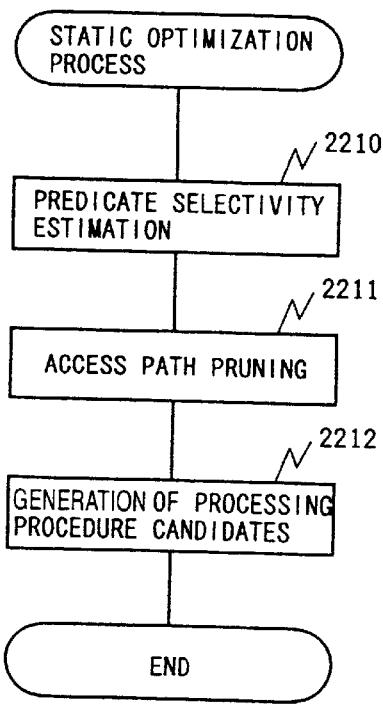
Figure 11:
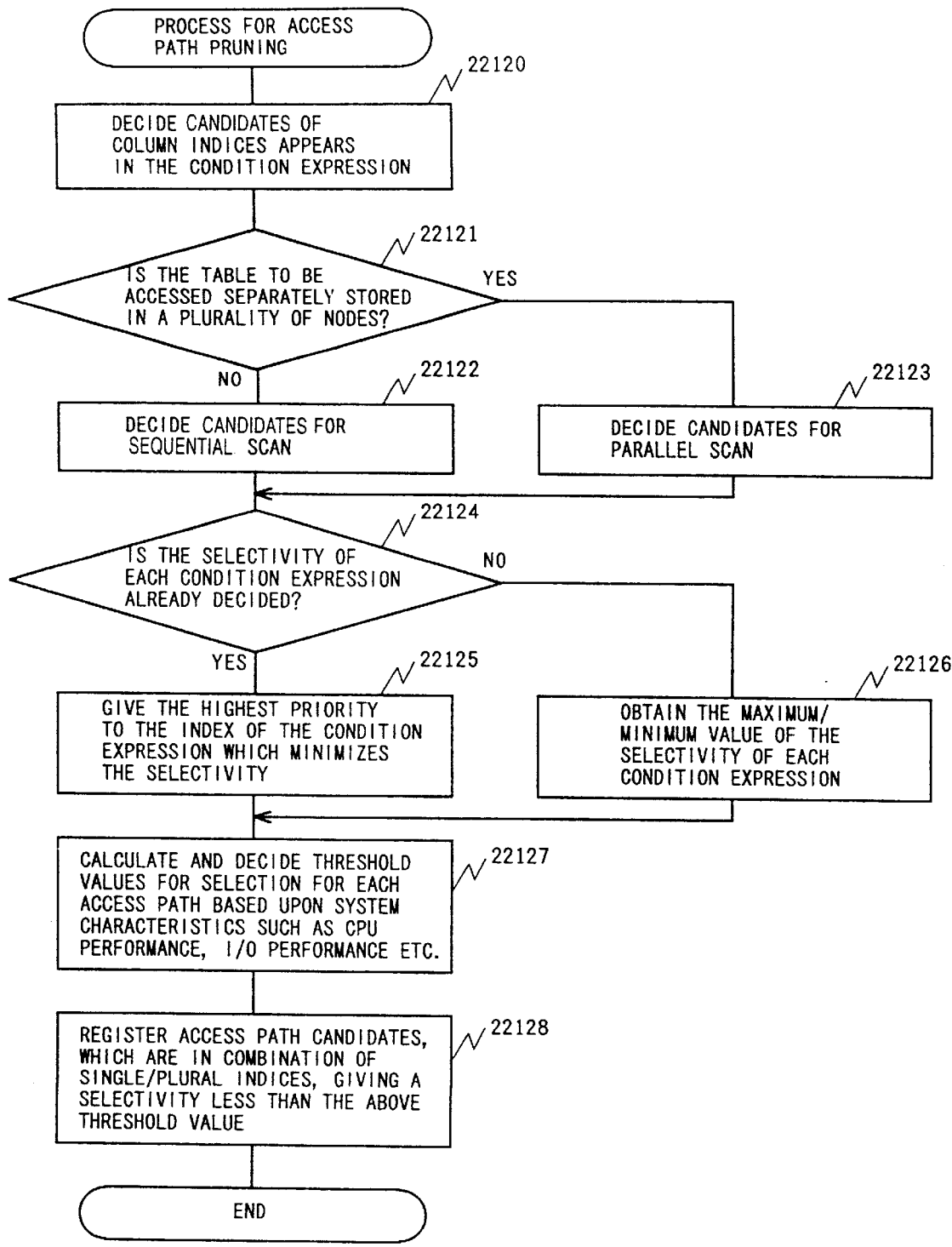
Figure 11:
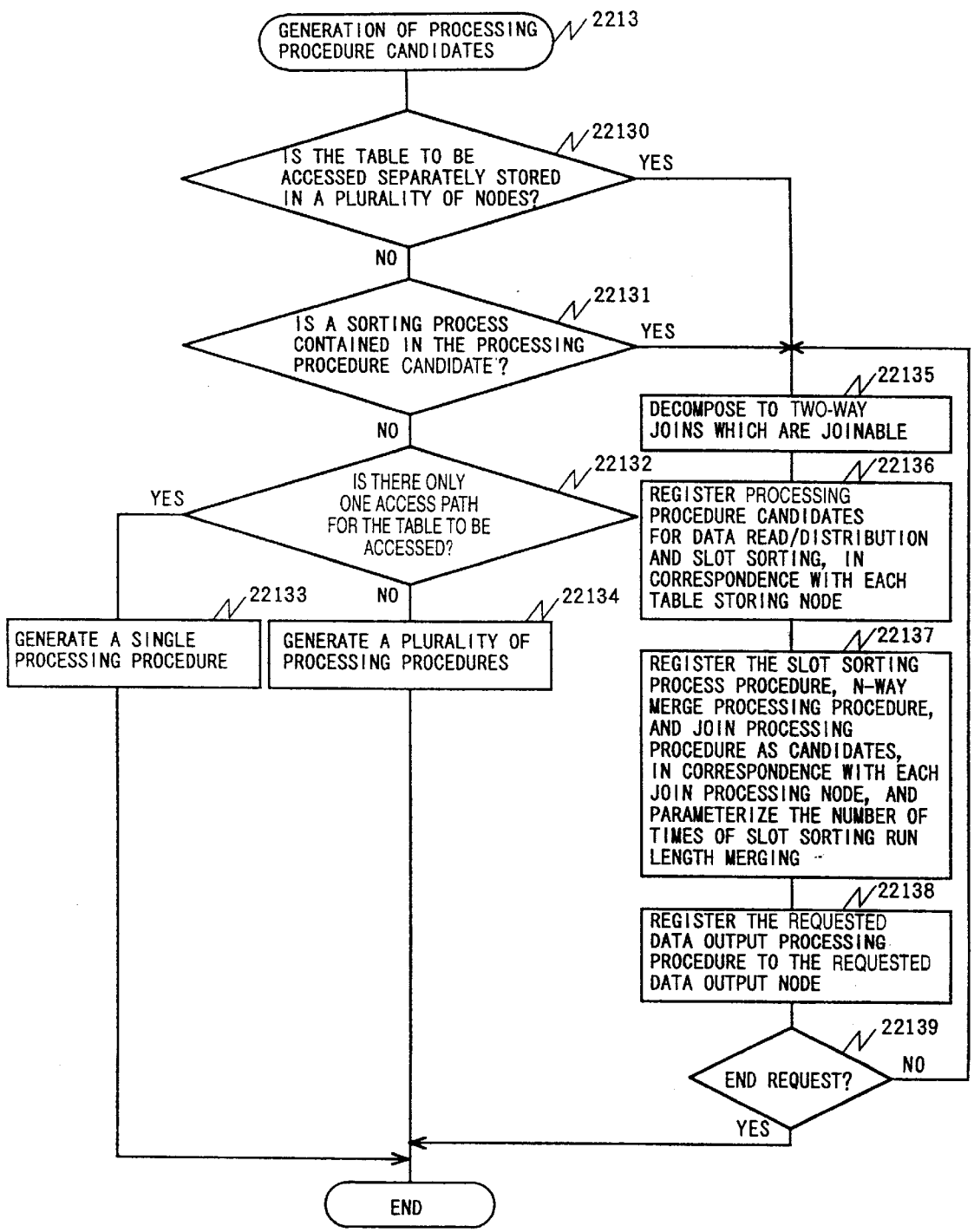
Figure 11F:
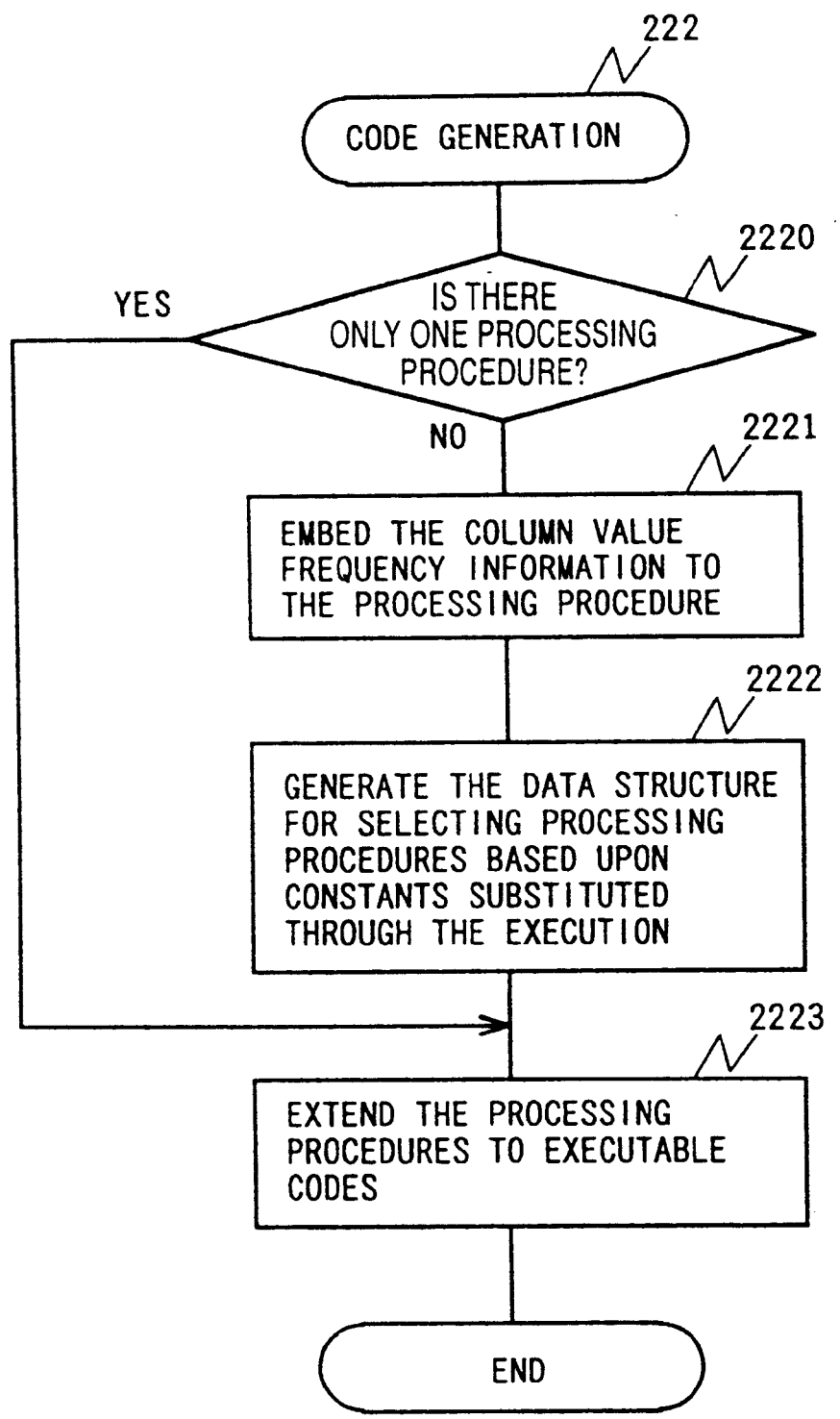

When the table is separately stored in a plurality of nodes, the database management system goes to Step 22135. When the table is not separately stored, the process for generation of processing procedure candidates checks whether the sorting process is necessary for executing the query (Step 22131). When the sorting process is necessary for the query process, the database management system goes to Step 22135. When the sorting process is not necessary for the processing procedure candidates, the process for generation of processing procedure candidates checks whether there is only one access path for the table to be accessed for the query (Step 22132). When there is only one access path, the process for generation of processing procedure candidates generates a single processing procedure corresponding to the access path and ends the processing (Step 22133). When there is only one access path, the process for generation of processing procedure candidates generates a plurality of processing procedures corresponding to the access paths and ends the processing (Step 22134). At Step 22135, the process for generation of processing procedure candidates decomposes the query to two-way joins which are joinable. Next, the process for generation of processing procedure candidates generates processing procedure candidates for data read on the basis of the registered access path candidates and processing procedure candidates for data distribution according to the decomposition result at Step 22135 in correspondence with the storing nodes where the table is separately stored. The process for generation of processing procedure candidates also generates processing procedure candidates for slot sorting when the slot sorting process is to be executed in the storing nodes. The process for generation of processing procedure candidates registers the processing procedure consisting of a combination of these processing procedure candidates as a processing procedure candidate in each distribution node (Step 22136). The process for generation of processing procedure candidates registers the processing procedure consisting of a combination of the slot sorting process procedure, N-way merge processing procedure, and join processing procedure as a processing procedure candidate in each join node in correspondence with each join processing node. Then, the process for generation of processing procedure candidates parameterizes the slot sorting run length and the number of merging times (Step 22137). The process for generation of processing procedure candidates registers the requested data output processing procedure to the requested data output node as a processing procedure candidate in the output node (Step 22138). Finally, the process for generation of processing procedure candidates ends the processing when the decomposition results are all evaluated and repeats Step 22135 and the subsequent steps when any decomposition results are not evaluated (Step 22139). FIG. 11(*f*) is a detailed flow chart of the code generation process (Step 222). The code generation process checks first whether there is only one processing procedure candidate generated by the static optimization process of Step 221 (Step 2220). When there is only one processing procedure candidate, the database management system goes to Step 2223 and extends the processing procedure candidate in the executable form. When there is only one processing procedure candidate, the code generation process embeds the column value frequency information in the processing procedure candidates (Step 2221) and generates the data structure for selecting an appropriate processing procedure from the processing procedure candidates based upon constants substituted through the query execution (Step 2222). Finally, the code generation process extends the processing procedures to executable codes (Step 2223).

Figure 12:
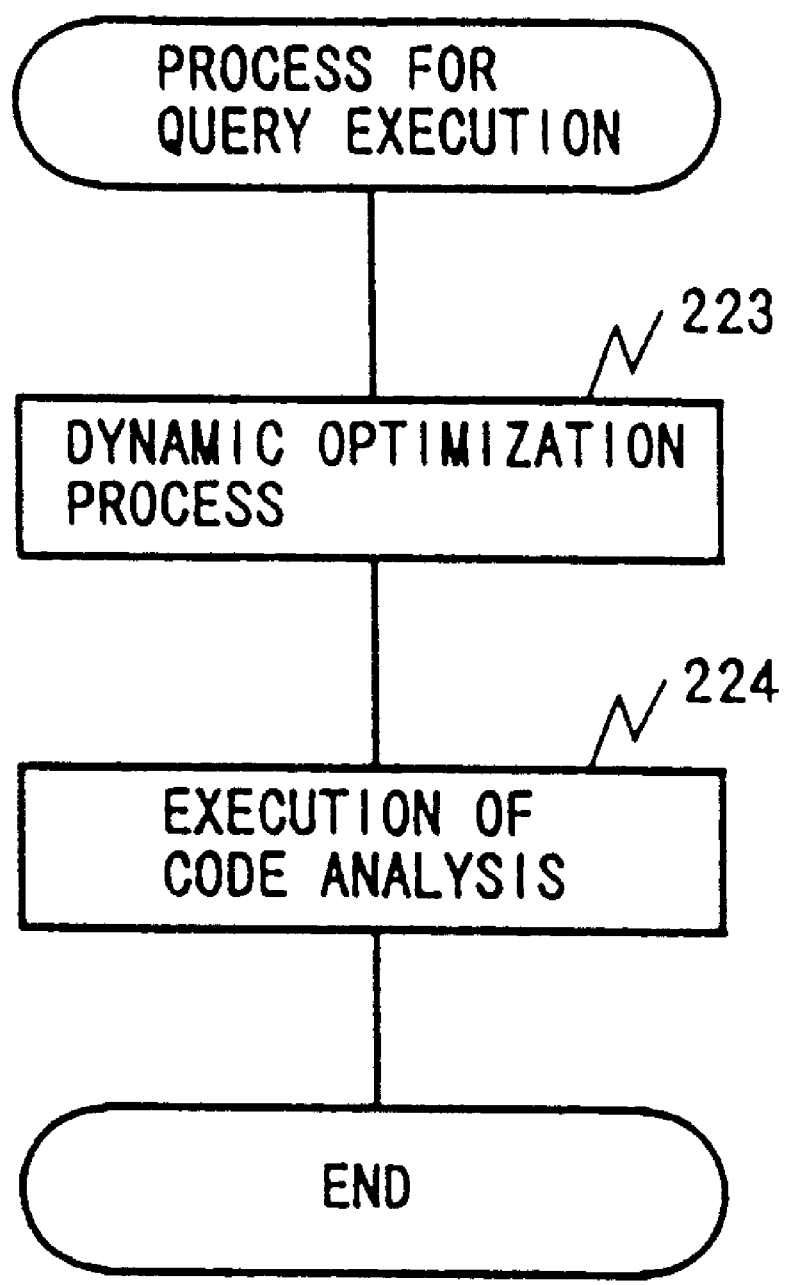
FIG. 12(*a*) is a flow chart of the process for query execution.
Figure 12B:
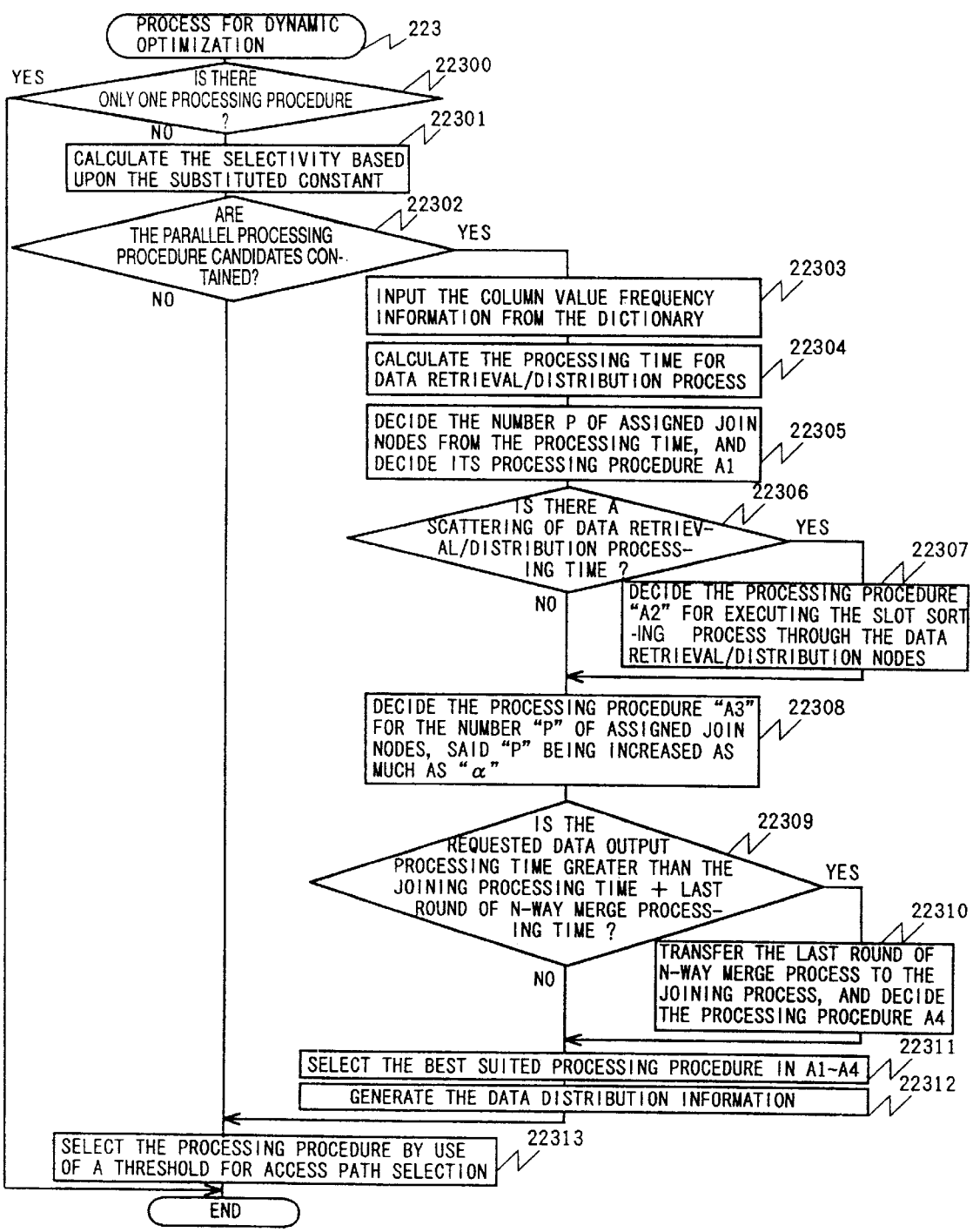
Figure 12C:
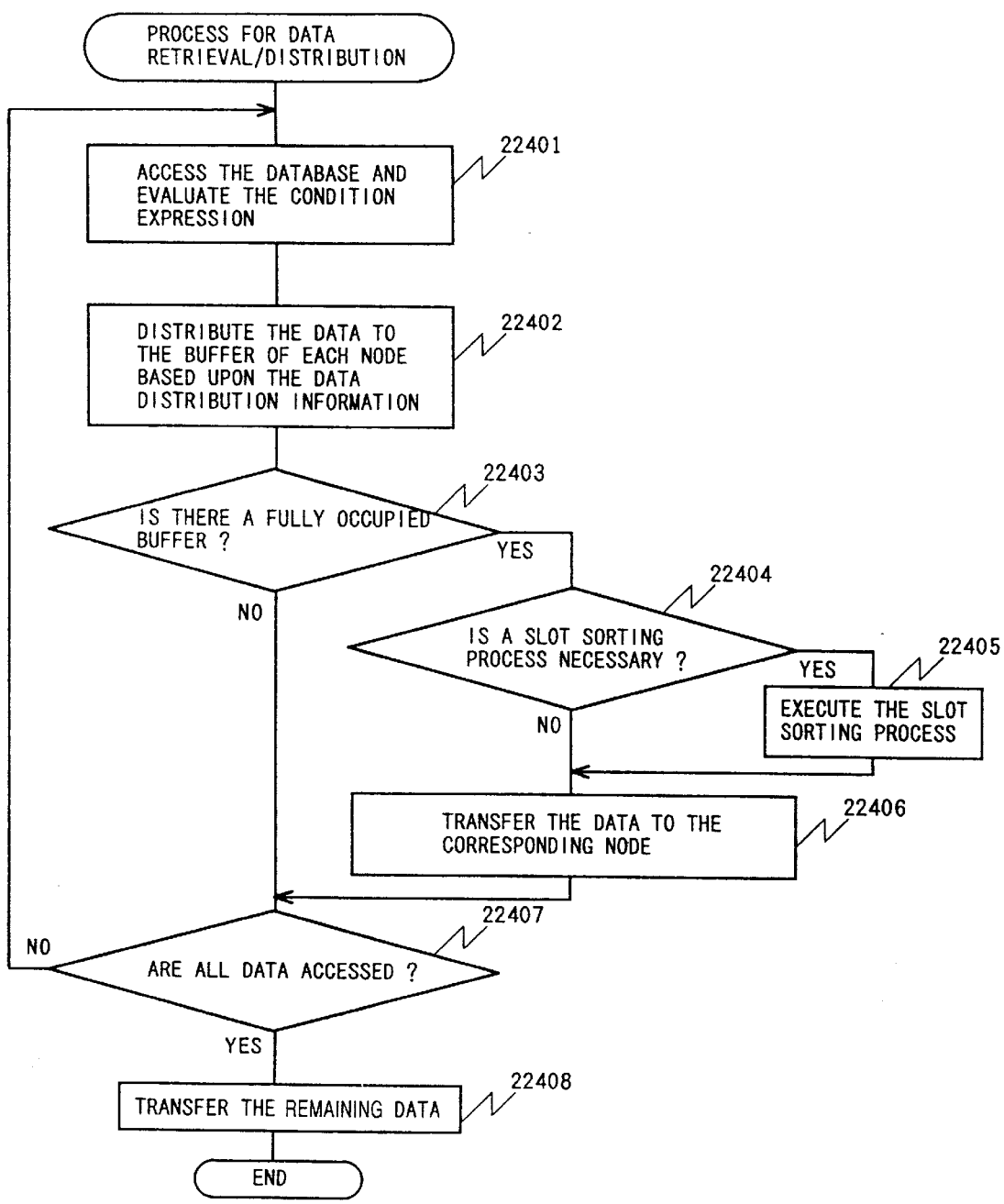
Figure 12D:
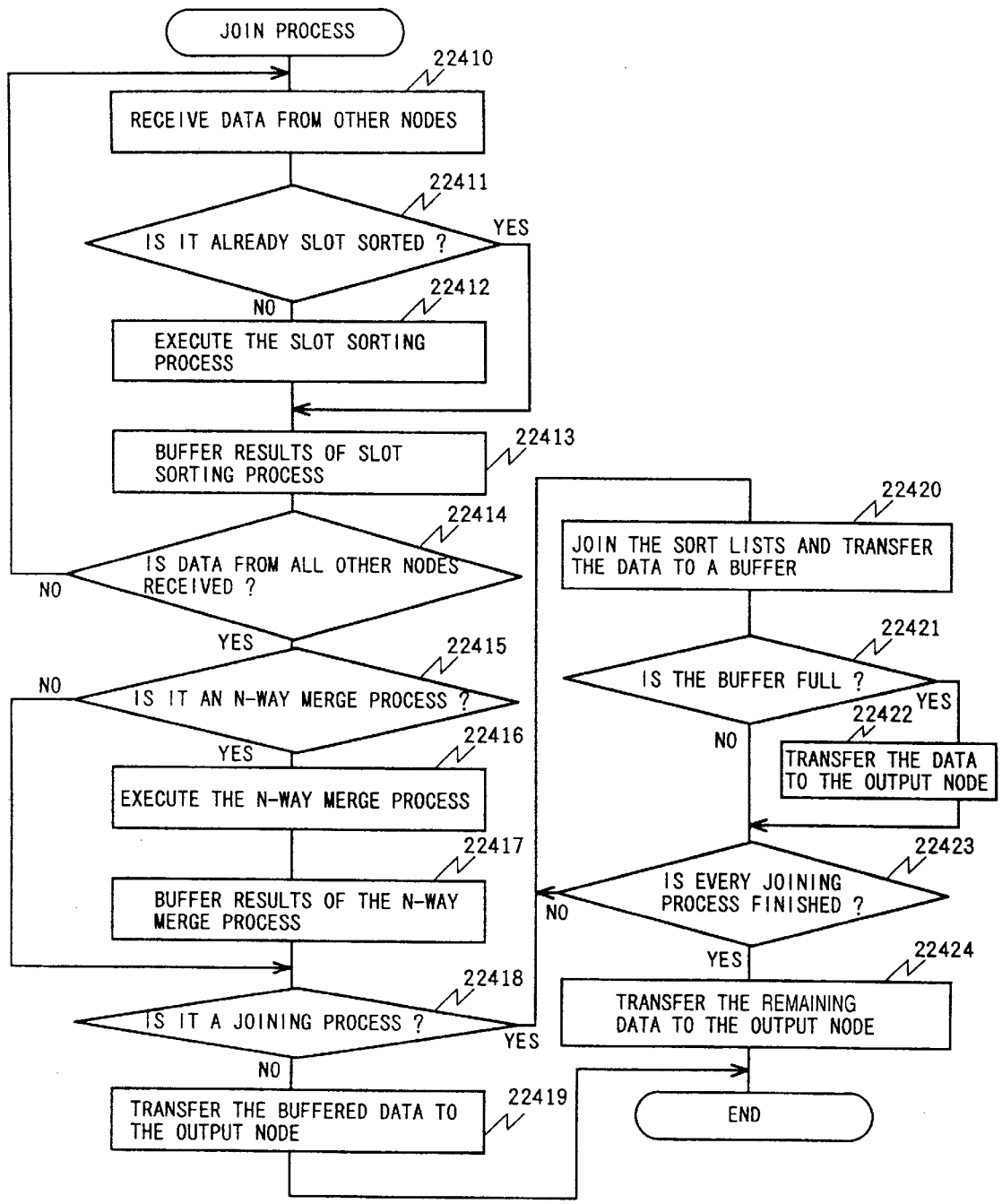
Figure 12E:
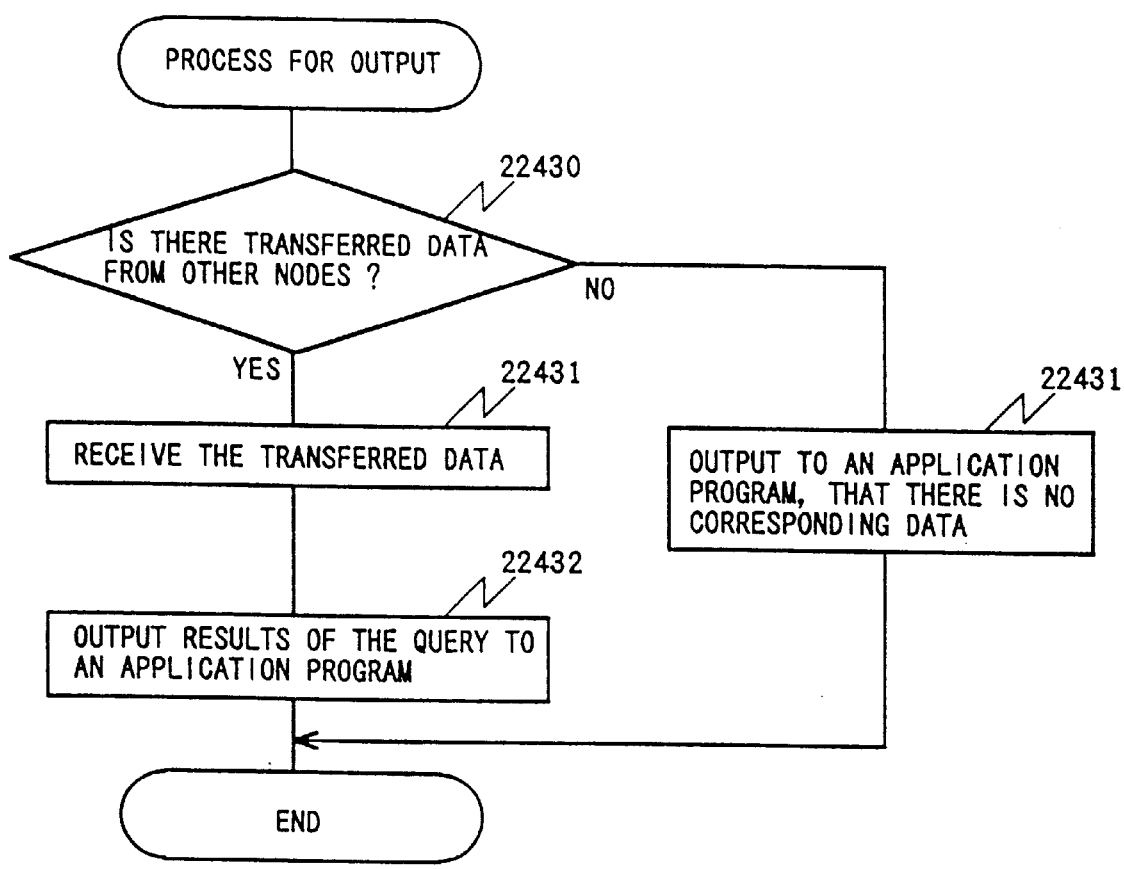

Next, the process when a query is actually executed will be explained. FIG. 12(*a*) is a flow chart of the process for query execution. For query execution, the decision management node first executes the process for dynamic optimization for deciding the processing procedure which is to be executed in each node on the basis of the substituted constants (Step 223). Next, each node interprets the processing procedure according to the processing procedure decided by the decision management node and executes the query (Step 224).

FIG. 12(*b*) is a flow chart showing the detailed procedure of the process for dynamic optimization (Step 223). The process for dynamic optimization checks whether there is only one processing procedure generated by the process for query analysis. When there is only one processing procedure, there is no need to execute the process for dynamic optimization and the database management system goes to the process for code interpretation execution without doing anything (Step 22300). When a plurality of processing procedures are generated by the process for query analysis, the process for dynamic optimization calculates the predicate selectivity based upon the substituted constant (Step 22301). Then, the process for dynamic optimization checks whether processing procedure candidates which are executed in parallel by a plurality of nodes are contained (Step 22302). When no corresponding processing procedure is contained, the process for dynamic optimization selects the processing procedure according to the threshold for access path selection and ends the processing (Step 22313). When a plurality of processing procedures which are executed in parallel are contained, the process for dynamic optimization inputs the column value frequency information (the join column value frequency information, the number of rows and the number of pages in the table which are to be accessed, etc.) from the dictionary (Step 22303) and calculates the processing time for data retrieval/distribution as mentioned above by considering each system characteristic (Step 22304). Then, the process for dynamic optimization decides the number "p" of nodes to be assigned to the join process from the processing time calculated at Step 22304 and selects the processing procedure "a1" for realizing the process explained in FIG. 7 from the processing procedure candidates (Step 22305). Next, the process for dynamic optimization checks whether there is a scattering in the data retrieval/distribution processing time in the data retrieval/distribution nodes (Step 22306). When there is a scattering in the data retrieval/distribution processing time, the process for dynamic optimization selects the processing procedure "a2" for executing the slot sorting process by nodes which can afford to execute the data retrieval/distribution process among the data retrieval/distribution nodes, that is, for realizing the process explained in FIG. 8 (Step 22307). The process for dynamic optimization increases the number "p" of assigned join nodes as much as "alpha" and selects the processing procedure "a3" for realizing the process explained in FIG. 9 (Step 22308). Furthermore, the process for dynamic optimization compares the requested data output processing time with the sum of the join processing time and the last round of N-way merge processing time and when the former is greater than the latter (Step 22309), selects the processing procedure "a4" for realizing the process in which the last round of N-way merge process is transferred to the join process as explained in FIG. 10 (Step 22310). In consideration of the response time, the load of each node, and the effect on the response performance of other transactions, the process for dynamic optimization selects the best suited processing procedure among the processing procedures "a1" to "a4" which are set above (Step 22311). After the processing procedure is selected, the process for dynamic optimization generates the data distribution information to be used for the data distribution process on the basis of the column value frequency information (Step 22312). When there is no column value frequency information, the process for dynamic optimization generates the data distribution information according to the join column evaluation value of the hash function. Finally, the process for dynamic optimization decides the processing procedure which is executed finally according to the threshold for access path selection and the process for dynamic optimization ends (Step 22313).

FIG. 12(*c*) is a detailed flow chart of the data retrieval distribution process which is executed by the distribution node in the process for code interpretation execution. The distribution node accesses the database connected to itself according to an instruction from the decision management node and evaluates the condition expression (Step 22401). Next, the distribution node retrieves data on the basis of the data distribution information which is generated on the basis of the column value frequency information and distributes the data sequentially to the buffer corresponding to each join node (Step 22402). The distribution node decides whether the buffer of each join node is fully occupied (Step 22403). When the buffer of each join node is not fully occupied, the database management system goes to Step 22407. When the buffer of each join node is fully occupied, the distribution node decides whether a slot sorting process is assigned (Step 22404). When no slot sorting process is assigned, the distribution node retrieves the data from the corresponding buffer and transfers the data to the join node corresponding to the buffer in the page form (Step 22406). On the other hand, when a slot sorting process is assigned, the distribution node executes the slot sorting process for the data in the buffer corresponding to the node which is decided to be fully occupied (Step 22405) and then transfers the data to the join node (Step 22406). At Step 22407, the distribution node decides whether all the data corresponding to the query are retrieved. When the retrieval is not finished, the distribution node repeats Step 22401 and the subsequent steps. When the retrieval of all the data corresponding to the query is finished, the distribution node transfers the remaining data in the buffers to the join nodes corresponding to the buffers and ends the distribution process (Step 22408).

FIG. 12(*d*) is a detailed flow chart of the join process which is executed by each join node in the process for code interpretation execution. Each join node receives data in the page form from the distribution nodes (Step 22410) and checks whether the received data is already slot sorted (Step 22411). When the received data is not slot sorted, the join node executes the slot sorting process for the data sequentially (Step 22412). The join node saves the slot sorted data or the slot sort result which is slot sorted at Step 22412 temporarily in the buffer (Step 22413). Next, the join node decides whether it has received all the data to be processed from the distribution nodes (Step 22414). When there is data which is not received, the join node executes Step 22410 and the subsequent steps repeatedly. When the join node receives all the data to be received and judges that the slot sorting process is finished for all the data at Step 22414, the join node judges whether an N-way merge process is set as a process to be executed by itself (Step 22415). When an N-way merge process is set, the join node executes the N-way merge process on the basis of the slot sort result (Step 22416) and saves results of the N-way merge process temporarily in the buffer (Step 22417). When Step 22417 ends or the decision result at Step 22415 is "NO", the join node judges whether a join process is set as a process to be executed by itself (Step 22418). When no join process is set, the join node transfers the data which is saved in the buffer temporarily as a result of the slot sorting process or N-way merge process to the output node sequentially and ends the processing (Step 22419). On the other hand, when a join process is set, the join node joins the sort lists and saves the results in the output buffer sequentially (Step 22420). The join node checks whether the output buffer is fully occupied (Step 22421). When the output buffer is fully occupied, the join node transfers the data in the buffer to the output node in the page form (Step 22422). Next, the join node judges whether all the join processes are finished (Step 22423). When all the join processes are not finished, the join node executes Step 22420 and the subsequent steps. When all the join processes are finished, the join node transfers the remaining data in the output buffer to the output node and ends the processing (Step 22424).

FIG. 12(*e*) is a detailed flow chart of the process executed by the output node in the process for code interpretation execution. The output node judges first whether there is transferred-data in the page form from other nodes (Step 22430). When there is transferred data in the page form, the output node receives the data in the page form (Step 22431) and outputs results of the query process sequentially to the application program (Step 22432). When there is no transferred data in the page form at Step 22430, the output node outputs information that there is no corresponding data to the query to the application program and ends the processing (Step 22424).

In the aforementioned embodiment, the process for dynamic optimization is executed using all of the join node assignment method explained in FIG. 7 and the tuning methods explained in FIGS. 8, 9, and 10. These methods may be used independently or any optional combination of them may be applied. In the above embodiment, the slot sorting process, N-way merge process, and join process are executed by the join nodes. However, these processes can be executed on different nodes respectively. Furthermore, for the tuning of the N-way merge process, the final stage of the N-way merge process is transferred from the merge phase to the join phase. However, the n-times (n≧1) of the N-way merge process can be transferred generally to the join phase.

Furthermore, the optimization method for query process which can be applied to this embodiment is not limited to a method using rules, which use statistic information, and cost evaluation. Any optimization method which can obtain a processing procedure for giving appropriate database reference characteristic information can be applied. For example, it can be applied also to a DBMS for executing an optimization process using only cost evaluation, or only rules, or both cost evaluation and rules.

As explained above, according to this embodiment, in correspondence with the database operations to be executed, the number of nodes for executing it is decided. When there is a scattering in distribution of data, by distributing the data equally to each node, parameterizing the database operation to be executed in each node, and equalizing the expected processing times, the processing times in the nodes will not be biased. Therefore, a smooth pipeline operation can be executed and the query process can be speeded up.

The present invention can be realized via a software system of a large scale computer employing a tightly/loosely coupled multi-processor system, or via a tightly/loosely coupled compound processor system having a dedicated processor for each processor of a database management system, or via a distribution system. A single processor system also can be applied by assigning a parallel process for each processing procedure.

What is claimed is:

1. A query operation method, in a database management system having a plurality of database processors and a plurality of functions designating database operation requests to said plurality of database processors, said method comprising the steps of:

analyzing an inputted query request;

generating a plurality of database operation requests corresponding to the analyzed query request, based upon a key range of a hash code obtained by a hash function which is assigned in advance to a database operation key;

sending the generated plurality of database operation requests to at least one of said database processors; and independently executing database operations in the database processors in response to the database operation requests.

2. A query operation method according to claim 1, further comprising:

a step of sending a data retrieval request to at least one of said database processors.

3. A query operation method according to claim 2, further comprising:

a step of sending a request of sorting data retrieved as a result of said data retrieval request, to said at least one of said database processors to which said data retrieval request was sent.

4. A query operation program, executable in a database management system having a plurality of database processors and a plurality of functions designating database operation requests to said plurality of database processors, said program comprising:

a step of analyzing an inputted query request;

a step of generating a plurality of database operation requests corresponding to the analyzed query request, based upon a key range of a hash code obtained by a hash function which is assigned in advance to a database operation key;

a step of sending the generated plurality of database operation requests to at least one of said database processors; and a step of independently executing database operations in the database processors in response to the database operation requests.

5. A computer readable storage medium storing a query operation program for execution in a database management system having a plurality of database processors and a plurality of functions designating database operation requests to said plurality of database processors, said program comprising:

a step of analyzing an inputted query request;

a step of generating a plurality of database operation requests corresponding to the analyzed query request, based upon a key range of a hash code obtained by a hash function which is assigned in advance to a database operation key;

a step of sending the generated plurality of database operation requests to at least one of said database processors; and a step of independently executing database operations in the database processors in response to the database operation requests.

6. A database management system, comprising:

a plurality of database processors;

means for designating database operation requests to said plurality of database processors;

means for analyzing an inputted query request;

means for generating a plurality of database operation requests corresponding to the analyzed query request, based upon a key range of a hash code obtained by a hash function which is assigned in advance to a database operation key;

means for sending the generated plurality of database operation requests to at least one of said database processors; and means for independently executing database operations in the database processors in response to the database operation requests.

7. A database management system according to claim 6, wherein said means for sending sends a data retrieval request to at least one of said database processors.

8. A database management system according to claim 7, wherein said sending means sends a request of sorting data retrieved as a result of said data retrieval request, to said at least one of said database processors to which said data retrieval request was sent.

9. A database management system having a plurality of database processors plurality of functions designating database operation requests to said plurality of database processors, said database management system comprising:

a first processor for analyzing an inputted query request, and for generating a plurality of database operation requests corresponding to the analyzed query request, based upon a key range of a hash code obtained by a hash function which is assigned in advance to a database operation key; and a second processor for sending the generated plurality of database operation requests to at least one of said database processors;

wherein said plurality of database processors independently execute database operations in response to the database operation requests.

10. A database management system according to claim 9, wherein said second processor further comprises:

means for sending a data retrieval request to at least one of said database processors.

11. A database management system according to claim 10, wherein said second processor further comprises:

means for sending a request of sorting data retrieved as a result of said data retrieval request, to said at least one of said database processors to which said data retrieval request was sent.

12. A query operation method for a database management system having a plurality of database processors, comprising the steps of:

analyzing an inputted query request;

generating and outputting a plurality of database operation requests corresponding to the analyzed query request, based upon a key range of a hash code obtained by a hash function which is assigned in advance to a database operation key; and independently executing database operations in the database processors in response to the plurality of database operation requests.

13. A query operation method according to claim 12, wherein said query request is a request of a join process, and said database operation key is a join key of said join process.

14. A query operation program, executable in a database management system having a plurality of database processors and a plurality of functions designating database operation requests to said plurality of database processors, said program comprising:

a step of analyzing an inputted query request;

a step of generating and outputting a plurality of database operation requests corresponding to the analyzed query request, based upon a key range of a hash code obtained by a hash function which is assigned in advance to a database operation key; and a step of independently executing database operations in the database processors in response to the database operation requests.

15. A query operation program according to claim 14, wherein said query request is a request of a join process, and said database operation key is a join key of said join process.

16. A computer readable storage medium storing a query operation program for execution in a database management system having a plurality of database processors, and a plurality of functions designating database operation requests to said plurality of database processors, said program comprising:

a step of analyzing an inputted query request;

a step of generating and outputting a plurality of database operation requests corresponding to the analyzed query request, based upon a key range of a hash code obtained by a hash function which is assigned in advance to a database operation key; and a step of independently executing database operations in the database processors in response to the database operation requests.

17. A storage medium according to claim 16, wherein said query request in said query operation program is a request of a join process, and said database operation key is a join key of said join process.

18. A query operation apparatus for a database management system having a plurality of database processors, comprising:

means for analyzing an inputted query request;

means for generating and outputting a plurality of database operation requests corresponding to the analyzed query request, based upon a key range of a hash code obtained by a hash function which is assigned in advance to a database operation key; and means for independently executing database operations in the database processors in response to the plurality of database operation requests.

19. A query operation apparatus, comprising:

a first processor for analyzing an inputted query request;

a second processor for generating and outputting a plurality of database operation requests corresponding to the analyzed query request, based upon a key range of a hash code obtained by a hash function which is assigned in advance to a database operation key; and a plurality of third processors for receiving the plurality of database operation requests and independently executing database operations in response to the database operation requests.

20. A database management system comprising:

a plurality of first nodes each having a storage unit for storing data constituting a database, and a controller for retrieving data from said storage unit in accordance with a retrieval request and for sending the retrieved data;

a plurality of second nodes each having a processor for executing a database operation on the data sent from at least one of said first nodes, in accordance with an inputted request for the database operation, and for outputting the result of said database operation; and a third node having a processor for analyzing an inputted retrieval request, generating a plurality of database operation requests based upon a key range of a hash code obtained by a hash function which is assigned in advance to a database operation key, and distributing the generated database operation requests to each of said second nodes, and further generating a plurality of data retrieval requests for retrieving the data to be retrieved by said data retrieval request, said third node further having a controller for sending the generated data retrieval requests to each of said first nodes, receiving the result of said database operation operated in accordance with said database operation request from each of said second nodes, and outputting the result of said retrieval conducted in accordance with said retrieval request;

wherein said second nodes execute operations in parallel with each other.

21. A query processing method performed in a database management system having a plurality of first nodes, a plurality of second nodes and a third node, said method comprising:

a process performed by said first nodes of retrieving data from a storage unit in said first nodes in accordance with a retrieval request, and sending the retrieved data;

a process performed by said second nodes of executing a database operation on the data sent from at least one of said first nodes, in accordance with an inputted request for the database operation, and outputting the result of said database operation; and a process performed by said third node of analyzing an inputted retrieval request, generating a plurality of database operation requests based upon a key range of a hash code obtained by a hash function which is assigned in advance to a database operation key, and distributing the generated database operation requests to each of said second nodes, and further generating a plurality of data retrieval requests for retrieving the data to be retrieved by said database retrieval request, sending the generated data retrieval requests to each of said first nodes, receiving the result of said database operation operated in accordance with said database operation request from each of said second nodes, and outputting the result of said retrieval conducted in accordance with said retrieval request;

wherein said second nodes execute operations independently of each other.

22. A database management system comprising:

a plurality of first nodes each having a storage unit for storing data constituting a database, and a controller for retrieving data from said storage unit in accordance with a retrieval request and for sending the retrieved data;

a plurality of second nodes each having a processor for executing a join operation on the data sent from at least one of said first nodes, in accordance with an inputted request for the join operation, and for outputting the result of said join operation; and a third node having a processor for analyzing an inputted join operation request, distributing a join operation key to a plurality of second nodes based upon a key range of join operation key, generating a plurality of join operation requests corresponding to the distributed join operation keys, and distributing the generated plurality of join operation requests to each of said second nodes, and further generating a plurality of data retrieval requests to be operated in said join operation request, said third node further having a controller for sending the generated data retrieval requests to each of said first nodes, receiving the result of said join operation operated in accordance with said join operation request from each of said second nodes, and outputting the result of said operation conducted in accordance with said join operation request;

wherein said second nodes execute operations independently of each other.

23. A query processing method in a database management system having a plurality of first nodes, a plurality of second nodes, and a plurality of third nodes, said method comprising:

a step performed in at least one of said first nodes, of retrieving data from a storage unit in accordance with a retrieval request and sending the retrieved data, each of said first nodes having said storage unit for storing data constituting a database;

a step performed in at least one of said second nodes, of executing a join operation on the data sent from at least one of said first nodes, in accordance with an inputted request for the join operation, and outputting the result of said join operation; and a step performed in at least one of said third nodes, of analyzing an inputted join operation request, distributing a join operation key to a plurality of second nodes based upon a key range of a join operation key, generating a plurality of join operation requests corresponding to the distributed join operation keys, and distributing the generated plurality of join operation requests to each of said second nodes, and further generating a plurality of data retrieval requests to be operated in said join operation request, sending the generated data retrieval requests to each of said first nodes, receiving from each of said second nodes the result of said join operation in accordance with said join operation request, and outputting the result of said operation conducted in accordance with said join operation request;

wherein said second nodes execute operations independently of each other.

* * * * *